United States Patent
Wang et al.

(10) Patent No.: US 11,997,544 B2
(45) Date of Patent: May 28, 2024

(54) REUSING SIDELINK RESOURCES

(71) Applicant: QUALCOMM Incorporated, San Diego, CA (US)

(72) Inventors: Xiaojie Wang, Hillsborough, NJ (US); Piyush Gupta, Bridgewater, NJ (US); Lik Hang Silas Fong, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 292 days.

(21) Appl. No.: 17/445,174

(22) Filed: Aug. 16, 2021

(65) Prior Publication Data

US 2022/0060945 A1    Feb. 24, 2022

Related U.S. Application Data

(60) Provisional application No. 63/067,153, filed on Aug. 18, 2020.

(51) Int. Cl.
*H04W 28/26* (2009.01)
*H04W 72/0453* (2023.01)
(Continued)

(52) U.S. Cl.
CPC ....... *H04W 28/26* (2013.01); *H04W 72/0453* (2013.01); *H04W 72/20* (2023.01); *H04W 92/18* (2013.01)

(58) Field of Classification Search
None
See application file for complete search history.

(56) References Cited

U.S. PATENT DOCUMENTS 9,439,039 B1 * 9/2016 Patil ............... H04W 4/023
11,678,325 B2 * 6/2023 Wang .............. H04L 43/16
370/329
(Continued)

FOREIGN PATENT DOCUMENTS

WO    WO-2020033704 A1 *  2/2020

OTHER PUBLICATIONS

Overall Description of Radio Access Network (RAN) Aspects for Vehicle-to-Everything (V2X) Based on LTE and NR, ETSI TR 137 985, V16.0.0, 2020-07, pp. 1-37. (Year: 2020).*
(Continued)

*Primary Examiner* — Nicholas Sloms
(74) *Attorney, Agent, or Firm* — Harrity & Harrity, LLP

(57) ABSTRACT

Various aspects of the present disclosure generally relate to wireless communication. In some aspects, a first user equipment (UE) may receive, from at least one second UE, first control information associated with a first reserved set of resources on a sidelink channel. The first UE may attempt to decode additional control information based at least in part on the first control information. The first UE may transmit, based at least in part on failing to decode the additional control information, a message using the first reserved set of resources. In some aspects, the first UE may determine, based on one or more resource dimensions, at least one first distance between the first UE and the at least one second UE, such that the message is transmitted with a first transmit power based at least in part on the first distance. Numerous other aspects are provided.

30 Claims, 13 Drawing Sheets

(51) Int. Cl.
*H04W 72/20* (2023.01)
*H04W 92/18* (2009.01)

(56) References Cited

U.S. PATENT DOCUMENTS

| | | | | |
|---|---|---|---|---|
| 2018/0131468 | A1* | 5/2018 | Blasco Serrano | H04L 1/0061 |
| 2018/0176747 | A1* | 6/2018 | Li | H04W 52/325 |
| 2019/0104525 | A1* | 4/2019 | Santhanam | H04L 1/1825 |
| 2019/0124490 | A1* | 4/2019 | Wu | H04W 72/12 |
| 2020/0059918 | A1* | 2/2020 | Lu | H04W 72/51 |
| 2020/0062270 | A1* | 2/2020 | Park | B60W 30/16 |
| 2020/0145978 | A1 | 5/2020 | Gulati et al. | |
| 2020/0220669 | A1* | 7/2020 | Park | H04L 1/1864 |
| 2020/0236656 | A1* | 7/2020 | Cao | H04W 80/02 |
| 2020/0404624 | A1* | 12/2020 | Roth | H04L 5/0044 |

OTHER PUBLICATIONS

APPLE: "Remaining Details on NR V2X Physical Layer Structure", 3GPP TSG RAN WG1 #100-e, 3GPP Draft, R1-2000850, 3rd Generation Partnership Project (3GPP), Mobile Competence Centre, 650, Route Des Lucioles, F-06921 Sophia-Antipolis Cedex, France, vol. RAN WG1, No. e-Meeting, Feb. 24, 2020-Mar. 6, 2020, Feb. 15, 2020 (Feb. 15, 2020), pp. 1-8, Mar. 6, 2020 (Mar. 6, 2020), XP051853468, Retrieved from the Internet: URL: https://ftp.3gpp.org/tsg_ran/WG1_RL1/TSGR1_100_e/Docs/R1-2000850.zip R1-2000850 Remaining Details on NR V2X Physical Layer Structure.docx [retrieved on Feb. 15, 2020] the whole document.

ASUSTEK: "Remaining Issues on Sidelink Physical Layer Procedure on NR V2X", 3GPP Draft, 3GPP TSG RAN WG1 #100, R1-2001017, 3rd Generation Partnership Project (3GPP), Mobile Competence Centre, 650, Route Des Lucioles, F-06921 Sophia-Antipolis Cedex, France, vol. RAN WG1, No. e-Meeting, Feb. 24, 2020-Mar. 6, 2020, Feb. 14, 2020 (Feb. 14, 2020), XP051853140, 16 Pages, Retrieved from the Internet: URL: https://ftp.3gpp.org/tsg_ran/WG1_RL1/TSGR1_100_e/Docs/R1-2001017.zip. R1-2001017, Remaining Issues on Sidelink Physical Layer Procedure_1.1.docx [Retrieved on Feb. 14, 2020], pp. 5-8, section 2.

International Search Report and Written Opinion—PCT/US2021/071210—ISA/EPO—dated Dec. 22, 2021.

Lenovo, et al., "Sidelink Physical Layer Structures in NR V2X", 3GPP Draft, 3GPP TSG RAN WG1 #99, R1-1912322, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 18, 2019-Nov. 22, 2019, Nov. 8, 2019 (Nov. 8, 2019), XP051819996, 10 Pages, Retrieved from the Internet: URL: https://ftp.3gpp.org/tsg_ran/WG1_RL1/TSGR1_99/Docs/R1-1912322.zip R1-1912322.docx. [Retrieved on Nov. 8, 2019] Section 11 2.2 Two Stage SCI Design, the whole document.

* cited by examiner

REUSING SIDELINK RESOURCES

CROSS-REFERENCE TO RELATED APPLICATION

This Patent application claims priority to U.S. Provisional Patent Application No. 63/067,153, filed on Aug. 18, 2020, entitled "REUSING SIDELINK RESOURCES BASED ON RESOURCE DISTANCE," and assigned to the assignee hereof. The disclosure of the prior Application is considered part of and is incorporated by reference in this Patent Application.

FIELD OF THE DISCLOSURE

Aspects of the present disclosure generally relate to wireless communication and to techniques and apparatuses for reusing sidelink resources.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to an apparatus for wireless communication at a first user equipment (UE). The apparatus may include a memory and one or more processors, coupled to the memory. The one or more processors may be configured to receive, from at least one second UE, first control information associated with a first reserved set of resources on a sidelink channel attempt to decode additional control information based at least in part on the first control information. The one or more processors may be further configured to transmit, based at least in part on failing to decode the additional control information, a message using the first reserved set of resources.

Some aspects described herein relate to a method of wireless communication performed by a first UE. The method may include receiving, from at least one second UE, first control information associated with a first reserved set of resources on a sidelink channel. The method may further include attempting to decode additional control information based at least in part on the first control information. The method may include transmitting, based at least in part on failing to decode the additional control information, a message using the first reserved set of resources.

Some aspects described herein relate to a non-transitory computer-readable medium that stores a set of instructions for wireless communication by a first UE. The set of instructions, when executed by one or more processors of the first UE, may cause the first UE to receive, from at least one second UE, first control information associated with a first reserved set of resources on a sidelink channel. The set of instructions, when executed by one or more processors of the first UE, may further cause the first UE to attempt to decode additional control information based at least in part on the first control information. The set of instructions, when executed by one or more processors of the first UE, may cause the first UE to transmit, based at least in part on failing to decode the additional control information, a message using the first reserved set of resources.

Some aspects described herein relate to an apparatus for wireless communication. The apparatus may include means for receiving, from at least one UE, first control information associated with a first reserved set of resources on a sidelink channel. The apparatus may further include means for attempting to decode additional control information based at least in part on the first control information. The apparatus may include means for transmitting, based at least in part on failing to decode the additional control information, a message using the first reserved set of resources.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
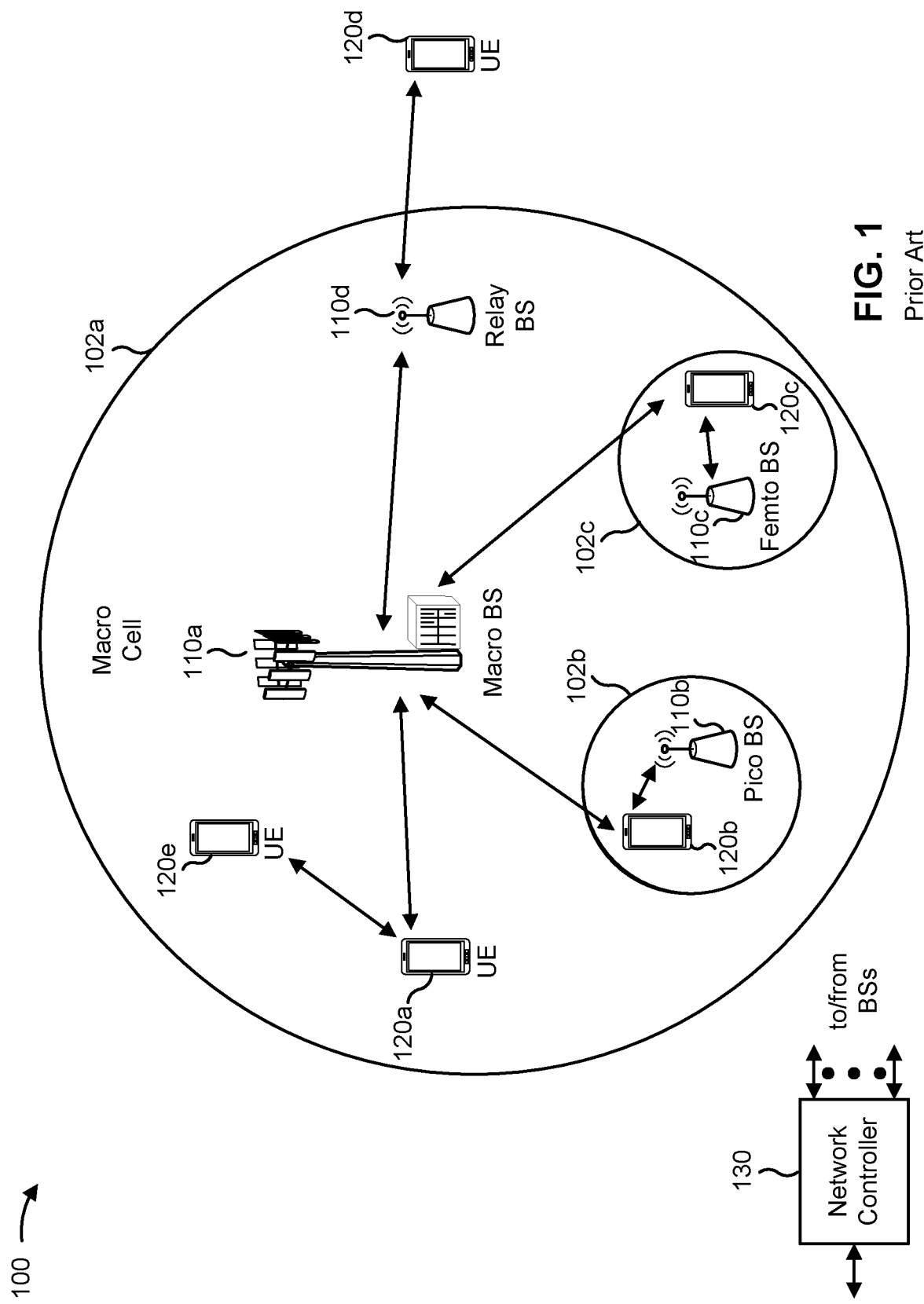
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

As indicated above, FIG. 1 is provided as an example. Other examples may differ from what is described with regard to FIG. 1.

Figure 2:
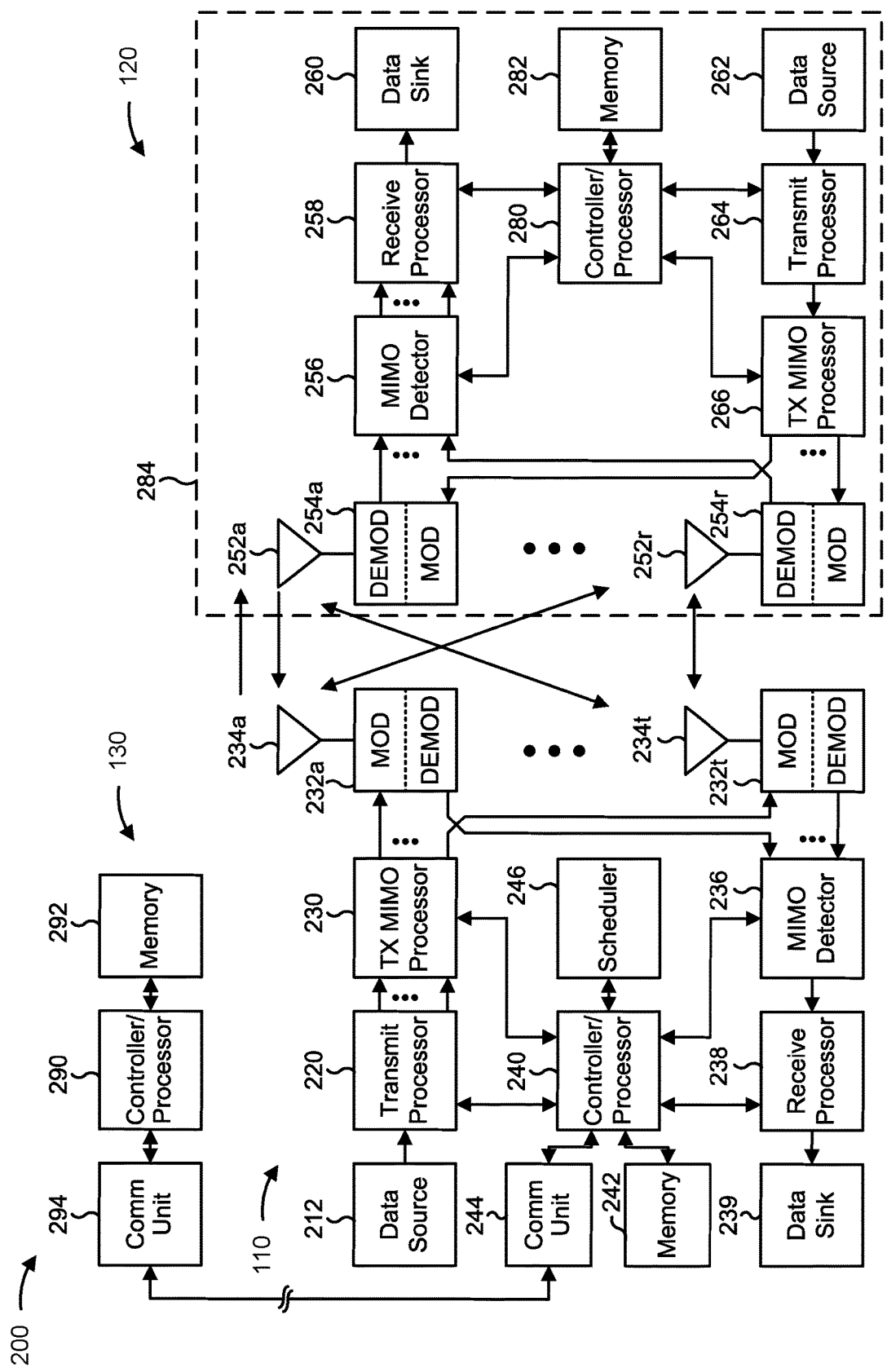
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 8-13).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 8-13).

The controller/processor 240 of the base station 110, the controller/processor 280 of the UE 120, and/or any other component(s) of FIG. 2 may perform one or more techniques associated with reusing sidelink resources, as described in more detail elsewhere herein. For example, the controller/processor 240 of the base station 110, the controller/processor 280 of the UE 120, and/or any other component(s) of FIG. 2 may perform or direct operations of, for example, process 1100 of FIG. 11, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1100 of FIG. 11, and/or other processes as described herein. In some examples, executing instructions may include running the instructions, converting the instructions, compiling the instructions, and/or interpreting the instructions, among other examples.

In some aspects, a first UE (e.g., UE 120a) includes means for receiving, from at least one second UE (e.g., UE 120e), first control information associated with a first reserved set of resources on a sidelink channel; means for attempting to decode additional control information based at least in part on the first control information; and/or means for transmitting, based at least in part on failing to decode the additional control information, a message using the first reserved set of resources. The means for the first UE to perform operations described herein may include, for example, one or more of antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
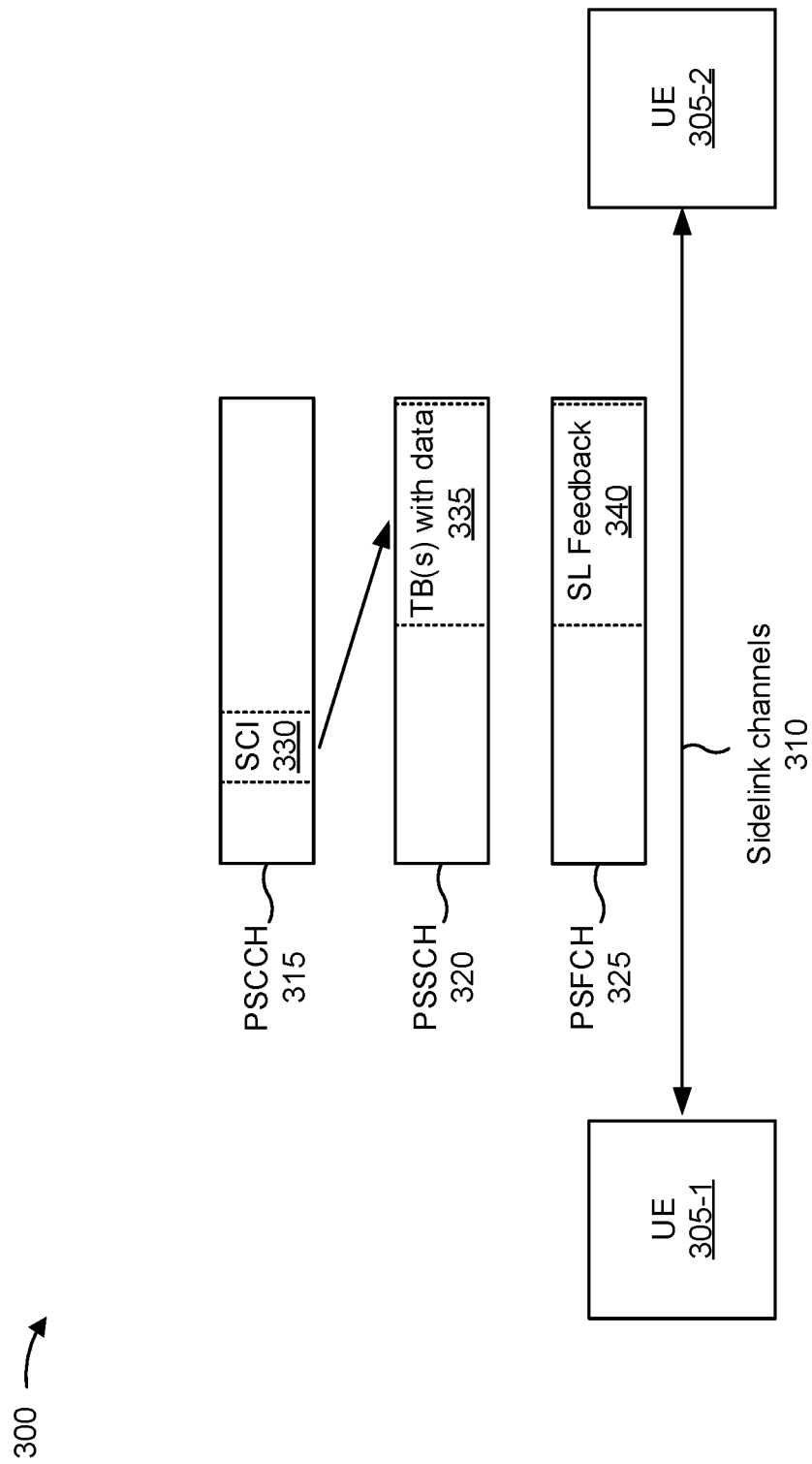
FIG. 3 is a diagram illustrating an example of sidelink communications, in accordance with the present disclosure.

FIG. 3 is a diagram illustrating an example 300 of sidelink communications, in accordance with the present disclosure. As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, and/or V2P communications) and/or mesh networking. In some aspects, the UEs 305 (e.g., UE 305-1 and/or UE 305-2) may correspond to one or more other UEs described elsewhere herein, such as UE 120. In some aspects, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, or symbols) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (e.g., time resources, frequency resources, and/or spatial resources) where a transport block (TB) 335 may be carried on the PSSCH 320. The TB 335 may include data. The PSFCH 325 may be used to communicate sidelink feedback 340, such as hybrid automatic repeat request (HARQ) feedback (e.g., acknowledgement or negative acknowledgement (ACK/NACK) information), transmit power control (TPC), and/or a scheduling request (SR).

Although shown on the PSCCH 315, in some aspects, the SCI 330 may include multiple communications in different stages, such as a first stage SCI (SCI-1) and a second stage SCI (SCI-2). The SCI-1 may be transmitted on the PSCCH 315. The SCI-2 may be transmitted on the PSSCH 320. The SCI-1 may include, for example, an indication of one or more resources (e.g., time resources, frequency resources, and/or spatial resources) on the PSSCH 320, information for decoding sidelink communications on the PSSCH, a quality of service (QoS) priority value, a resource reservation period, a PSSCH DMRS pattern, an SCI format for the SCI-2, a beta offset for the SCI-2, a quantity of PSSCH DMRS ports, and/or an MCS. The SCI-2 may include information associated with data transmissions on the PSSCH 320, such as a HARQ process ID, a new data indicator (NDI), a source identifier, a destination identifier, and/or a channel state information (CSI) report trigger.

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a transmission mode where resource selection and/or scheduling is performed by the UE 305 (e.g., rather than a base station 110). In some aspects, the UE 305 may perform resource selection and/or scheduling by sensing channel availability for transmissions. For example, the UE 305 may measure an RSSI parameter (e.g., a sidelink-RSSI (S-RSSI) parameter) associated with various sidelink channels, may measure an RSRP parameter (e.g., a PSSCH-RSRP parameter) associated with various sidelink channels, and/or may measure an RSRQ parameter (e.g., a PSSCH-RSRQ parameter) associated with various sidelink channels, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources and/or channel parameters. Additionally, or alternatively, the UE 305 may perform resource selection and/or scheduling by determining a channel busy rate (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, and/or an MCS to be used for the upcoming sidelink transmission. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

As indicated above, FIG. 3 is provided as an example. Other examples may differ from what is described with respect to FIG. 3.

Figure 4:
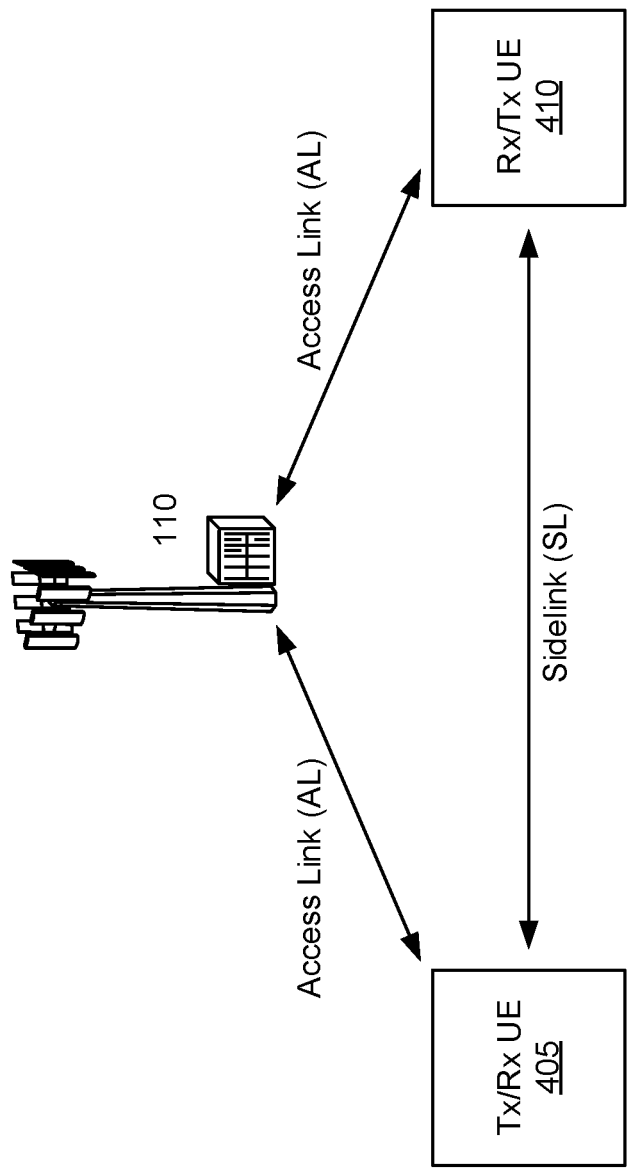
FIG. 4 is a diagram illustrating an example of sidelink communications and access link communications, in accordance with the present disclosure.

FIG. 4 is a diagram illustrating an example 400 of sidelink communications and access link communications, in accordance with the present disclosure. As shown in FIG. 4, a transmitter (Tx)/receiver (Rx) UE 405 and an Rx/Tx UE 410 may communicate with one another via a sidelink, as described in connection with FIG. 3. As further shown, in some sidelink modes, a base station 110 may communicate with the Tx/Rx UE 405 via a first access link. Additionally, or alternatively, in some sidelink modes, the base station 110 may communicate with the Rx/Tx UE 410 via a second access link. The Tx/Rx UE 405 and/or the Rx/Tx UE 410 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

As indicated above, FIG. 4 is provided as an example. Other examples may differ from what is described with respect to FIG. 4.

Figure 5:
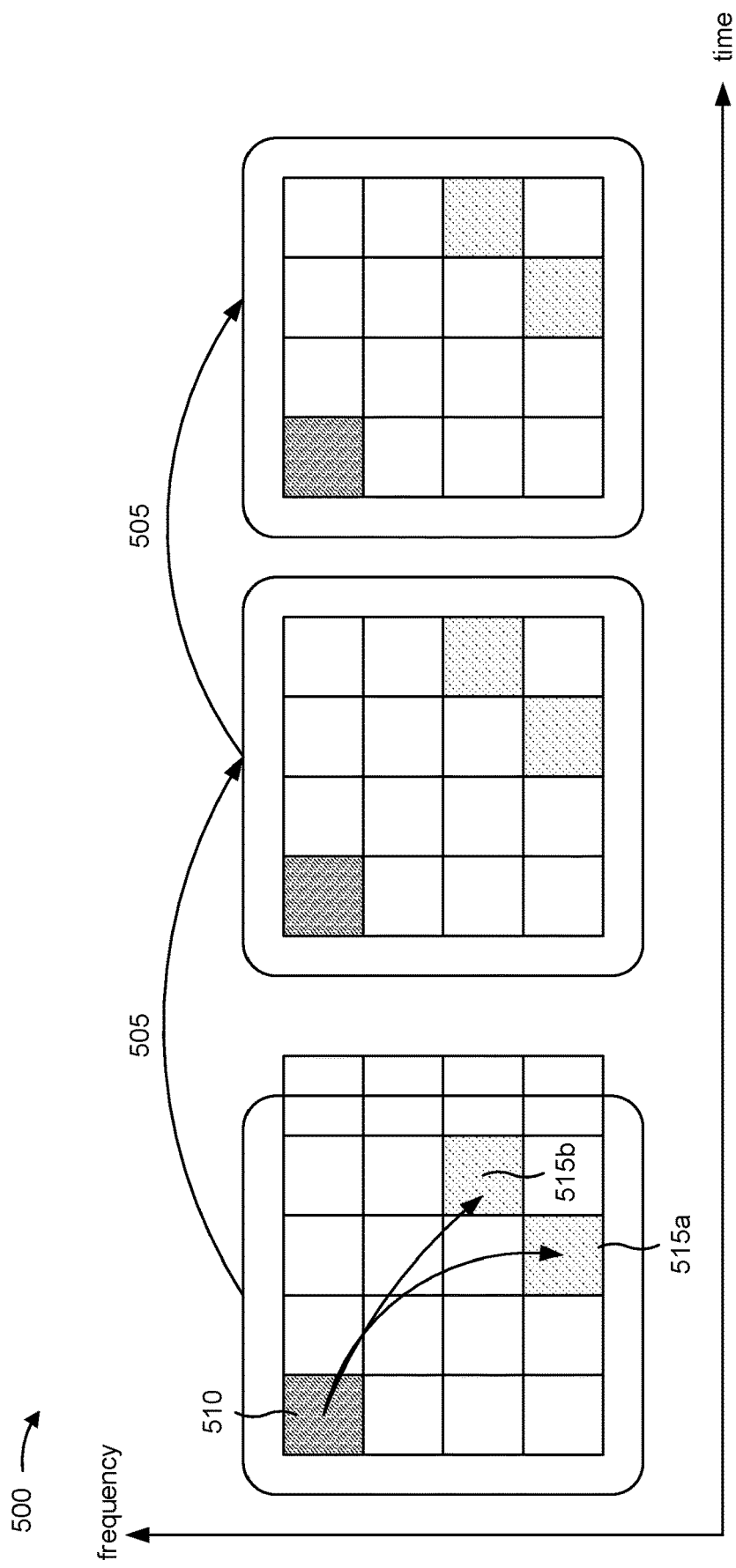
FIG. 5 is a diagram illustrating an example of resource reservation on a sidelink channel, in accordance with the present disclosure.

FIG. 5 is a diagram illustrating an example 500 of resource reservation on a sidelink channel, in accordance with the present disclosure. In example 500, a UE (e.g., UE 120) on a sidelink channel may reserve resources in time and/or frequency using SCI 510. In some aspects, the reservation may be periodic (e.g., repeating every period 505). For example, the UE 120 may transmit first stage SCI (SCI-1, also referred to as SCI0_1) to reserve symbols 515a and 515b every period 505. In some aspects, the reservation may expire after a number of periods.

As indicated above, FIG. 5 is provided as an example. Other examples may differ from what is described with respect to FIG. 5.

Figure 6:
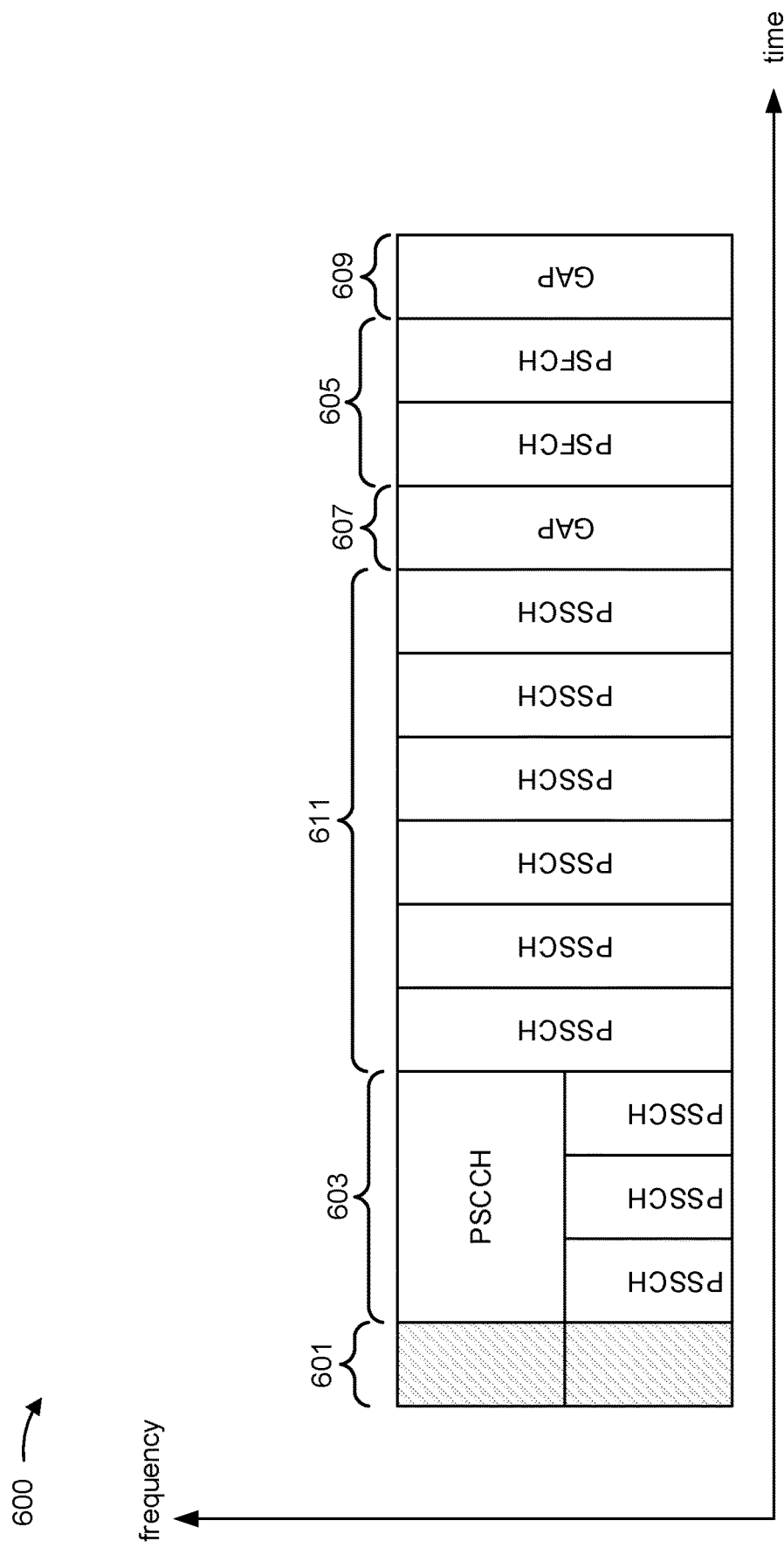
FIG. 6 is a diagram illustrating an example of symbol allocation within a slot on a sidelink channel, in accordance with the present disclosure.

FIG. 6 is a diagram illustrating an example 600 of symbol allocation within a slot on a sidelink channel, in accordance with the present disclosure. In example 600, a slot for a sidelink channel (e.g., channel 310 as described in connection with FIG. 3) may be allocated for different communications. As used herein, "slot" may refer a portion of a radio frame within an LTE, 5G, or other wireless communication structure. In some aspects, a slot may include one or more symbols. Moreover, "symbol" may refer to an OFDM symbol or other similar symbol within a slot.

As shown in FIG. 6, the first symbol 601 (also referred to as symbol 0) may be reserved (e.g., for a cyclic prefix). Additionally, some symbols (e.g., symbols 603 in example 600) may be divided between a control channel (e.g., a PSCCH) and a data channel (e.g., a PSSCH). Accordingly, in example 600, one sub-channel is allocated to the PSCCH and one sub-channel is allocated to the PSSCH. Other examples may include additional sub-channels for the PSCCH and/or additional sub-channels for the PSSCH.

As further shown in FIG. 6, some symbols (e.g., symbols 605 in example 600) may be allocated to a feedback channel (PSFCH). In some aspects, the feedback channel may include a leading symbol (e.g., symbol 607 in example 600) and/or a trailing symbol (e.g., symbol 609 in example 600) that is reserved as a gap between the data channel and the feedback channel. Remaining symbols (e.g., symbols 611 in example 600) may also be allocated to the data channel (e.g., the PSSCH).

As indicated above, FIG. 6 is provided as an example. Other examples may differ from what is described with respect to FIG. 6.

Figure 7:
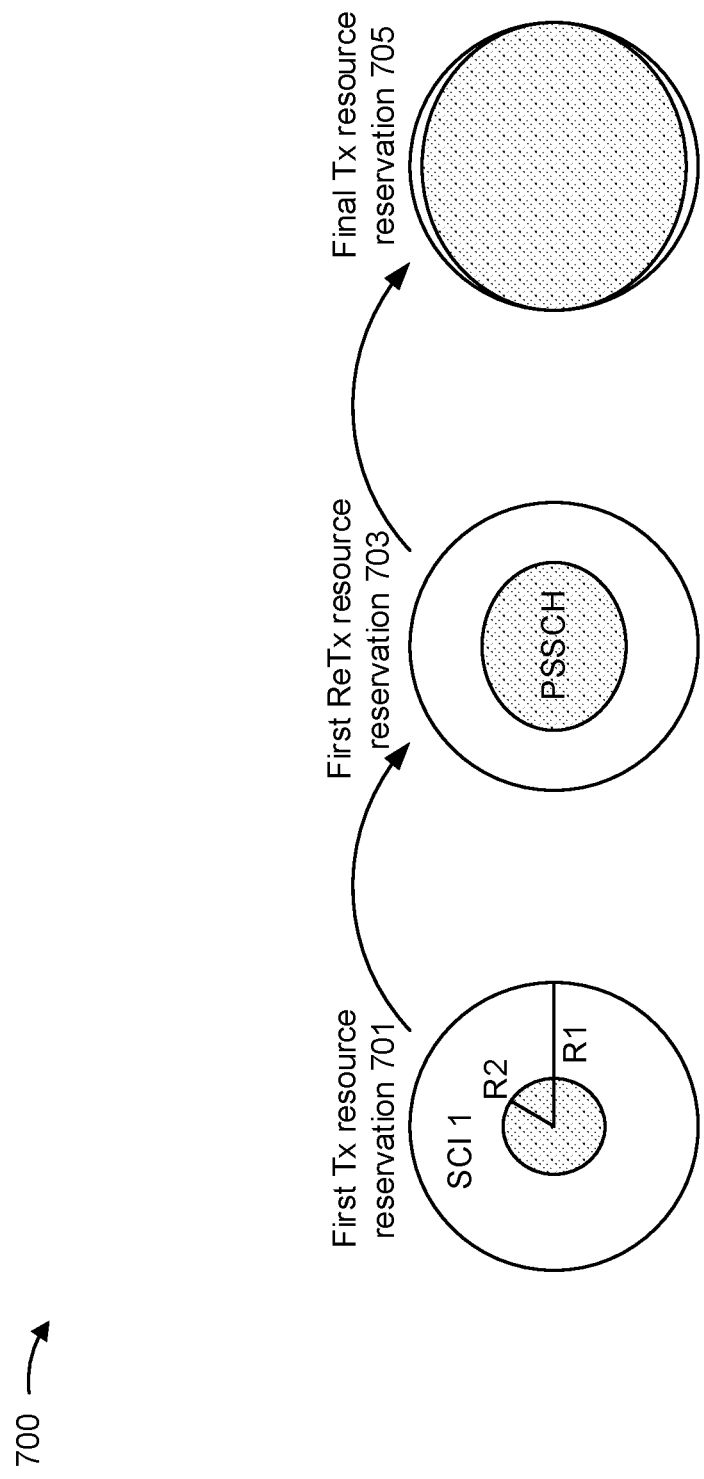
FIG. 7 is a diagram illustrating an example of resource reservations for first transmissions, retransmissions, and final transmissions, in accordance with the present disclosure.

FIG. 7 is a diagram illustrating an example 700 of resource reservations for first transmissions, retransmissions, and final transmissions, in accordance with the present disclosure. In example 700, a UE (e.g., UE 120) may transmit SCI (e.g., SCI1) to reserve resources (e.g., one or more symbols within one or more sub-channels for a PSSCH, as described in connection with FIG. 6) on a sidelink channel (e.g., channel 310 as described in connection with FIG. 3).

As shown by reference number 701, the SCI1 may reserve resources with a larger propagation distance R1 than used for the first transmission (which may have a smaller propagation distance R2). For example, the SCI1 may reserve more resources along a frequency dimension, a time dimension, and/or a physical distance dimension, than used for the first transmission. For example, the SCI1 may be reliably decoded within the propagation distance R1 such that neighboring UEs that decode the SCI1 are aware of the reserved resources. The first transmission is then scheduled by SCI2 that may be reliability decoded within propagation distance R2. In order to avoid interference with neighboring UEs that were unable to decode the SCI1, the propagation distance R2 may be smaller than the propagation distance R1.

Similarly, as shown by reference number 703, the UE 120 may use a larger portion of the reserved resources for retransmissions but still smaller than the portion of the reserved resources used for final transmissions, as shown by reference number 705. Accordingly, the portion of the reserved resources used on the sidelink channel may vary depending on when the UE 120 is transmitting (e.g., whether transmitting a first transmission, a retransmission, or a final transmission, among other examples).

As indicated above, FIG. 7 is provided as an example. Other examples may differ from what is described with respect to FIG. 7.

In some situations, a UE may not reuse resources reserved by one or more other UEs on a sidelink channel (e.g., using SCI1). However, the reserved resources are not all in use by the one or more other UEs (e.g., as described in connection with FIG. 7). Accordingly, spectral efficiency on the sidelink channel is decreased.

Techniques and apparatuses described herein allow a UE (e.g., UE 120a) to reuse resources reserved by another UE (e.g., UE 120b) on a sidelink channel (e.g., channel 310 as described in connection with FIG. 3). Accordingly, the UE 120a and the UE 120b improve spectral efficiency on the sidelink channel. Increased spectral efficiency leads to increased reliability and/or quality of communications on the sidelink channel. Moreover, the UE 120a may reuse resources without interfering with the first transmission, the retransmission, or the final transmission of the UE 120b. Reduced interference allows UEs on the sidelink channel to conserve power and processing resources by reducing chances of the UEs having to perform retransmissions.

Figure 8:
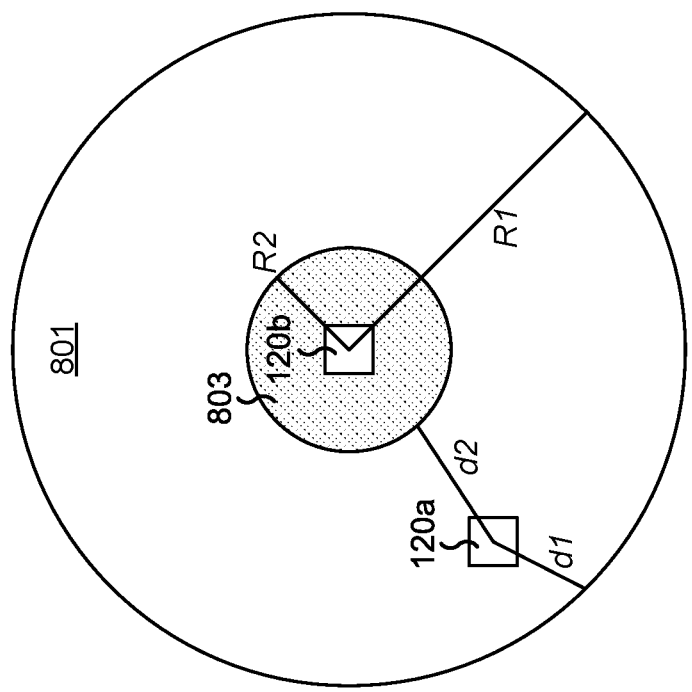
FIGS. 8, 9, and 10 are diagrams illustrating examples associated with reusing sidelink resources, in accordance with the present disclosure.

FIG. 8 is a diagram illustrating an example 800 associated with reusing sidelink resources, in accordance with the present disclosure. As shown in FIG. 8, example 800 includes a first reserved set of resources 801 that were reserved by SCI (e.g., SCI 0_1). For example, a first UE 120a may decode the SCI, which reserves resources 801, transmitted by at least one other UE (e.g., UE 120b). In some aspects, the UE 120a, the UE 120b, and other UEs may be included in a wireless network, such as wireless network 100. The UE 120a, the UE 120b, and other UEs may communicate on a sidelink channel (e.g., channel 310 as described in connection with FIG. 3). Although the description below focuses on the first UE 120a and the second UE 120b, the description similarly applies when the first UE 120a receives SCI from a plurality of second UEs.

Accordingly, in some aspects, the first UE 120a may receive, from the second UE 120b, first control information (e.g., SCI 0_1) associated with the first reserved set of resources 801 on the sidelink channel. For example, as described in connection with FIG. 7, the second UE 120b may transmit the first control information to reserve resources along a frequency dimension, a time dimension, and/or a physical distance dimension. In some aspects, the first UE 120a may identify the first reserved set of resources 801 by decoding the first control information. For example, the first UE 120a may use a frequency domain resource allocation, a time domain resource allocation, and/or a resource reservation period, among other examples, decoded from the first control information to identify the first reserved set of resources 801.

In some aspects, the first UE 120a may further determine a subset of unoccupied resources within the first reserved set of resources by failing to decode additional control information (e.g., second stage SCI (SCI2)). For example, when the first UE 120a can decode the additional control information, the first UE 120a may mark the resource 803 (e.g., symbol, slot, and/or sub-channel) in which the first UE 120a decoded the additional control information as occupied. Accordingly, the first UE 120a may attempt to reuse other resources within the first reserved set of resources 801 rather than the resource in which the first UE 120a decoded the additional control information. As an alternative, the first UE 120a may further determine the subset of unoccupied resources within the first reserved set of resources 801 based at last in part on as first distance (e.g., as described below) even when the first UE 120a decodes additional control information (e.g., SCI2). Accordingly, the first UE 120a may attempt to reuse resources within the first reserved set of resources 801 as long as at least the first distance satisfies a condition (e.g., a threshold).

As further shown in FIG. 8, the first UE 120a may determine, based on one or more resource dimensions, a first distance (e.g., represented by d2 in example 800) between the first UE 120a and the second UE 120b. The first distance d2 may be along one or more resource dimensions (e.g., time, frequency and/or spatial distance).

In some aspects, the first UE 120a may determine the distance d2 by measuring a reference signal (e.g., a DMRS) associated with the first control information and determining a pathloss estimate to the second UE 120b based at least in part on measuring the reference signal. For example, the reference signal may have been multiplexed with the first control information or may be transmitted using a resource (e.g., a symbol and/or a frequency) indicated by the first control information.

In some aspects, and as further shown in FIG. 8, the first UE 120a may determine a coverage distance (e.g., represented by R1 in example 800) associated with the first reserved set of resources 801 by decoding, at least in part, the first control information (e.g., determining an MCS of the first control information). For example, as described above, the first UE 120a may determine the coverage distance R1 based at least in part on one or more frequency domain resources, one or more time domain resources, an MCS, and/or power measurements, among other examples, determined from the first control information. In some aspects, the first UE 120a may additionally, or alternatively, use, at least in part, a physical distance between the first UE 120a and the second UE 120b to determine the coverage distance. For example, a higher layer of the first UE 120a may determine the physical distance between the first UE 120a and the second UE 120b (e.g., using reference signal measurements and/or mobility signaling).

In some aspects, the first UE 120a may additionally determine a propagation distance (e.g., represented by R2 in example 800) associated with the first reserved set of resources 801 based at least in part on information obtained by decoding the first control information. For example, the first UE 120a may estimate the propagation distance R2 based at least in part on an MCS, and/or a size, among other examples, for a data channel associated with the second UE 120b, indicated by the first control information.

In some aspects, the first UE 120a may determine the first distance d2 based at least in part on an estimate of interference, between a data channel associated with the first UE 120a and a data channel associated with the second UE 120b, using the first reserved set of resources. Similarly, in some aspects, the first UE 120a may further determine, based on the one or more resource dimensions, a second distance (e.g., represented by d1 in example 800) based at least in part on an estimate of interference between a control channel associated with the first UE 120a and a control channel associated with the second UE 120b.

Based at least in part on decoding the first control information, the first UE 120a may transmit a message using the first reserved set of resources 801. In some aspects, the first UE 120a may transmit the message using a first transmit power based at least in part on the first distance. For example, the first UE 120a may determine the first transmit power such that the message will not interfere with the data channel associated with the second UE 120b (e.g., a PSSCH). In some aspects, the first UE 120a may further determine the transmit power based at least in part on the second distance. For example, the first UE 120a may determine the first transmit power such that the message will not propagate outside the coverage distance associated with the first reserved set of resources 801 (e.g., as described in connection with FIG. 10).

In some aspects, the first UE 120a may select one or more resources (e.g., symbols and/or sub-channels) for transmitting the message based at least in part on the first transmit power. For example, the first UE 120a may select one or more resources further in frequency and/or time, from the data channel associated with the second UE 120b, when the first transmit power is higher.

The first UE 120a may perform determination of the first distance and/or the second distance separately for first transmissions, retransmissions, and final transmissions. For example, the first UE 120a may determine, based on the one or more resource dimensions, a third distance based at least in part on an estimate of interference between a data channel associated with the first UE 120 and a data channel used for retransmission and associated with the second UE 120b. Accordingly, when transmitting within a time period associated with the retransmission (e.g., rather than the first transmission), the first UE 120a may determine a second transmit power, for transmitting the message, based at least in part on the third distance rather than the first distance. In some aspects, the first UE 120a may further determine a fourth distance based at least in part on an estimate of interference between a control channel associated with the first UE 120 and a control channel used for retransmission and associated with the second UE 120b. Accordingly, the first UE 120a may determine the second transmit power based at least in part on the fourth distance rather than the second distance.

In some aspects, the first UE 120a may not transmit the message in a time period associated with a final transmission within the first reserved set of resources. For example, as described in connection with FIG. 7, the final transmission may occupy most, if not all, of the first reserved set of resources in order to achieve high reliability, such that the first UE 120a determines a transmit power, for transmitting the message within a time period associated with the final transmission, as zero.

By using techniques as described in connection with FIG. 8, the first UE 120a reuses resources on a sidelink channel reserved by the second UE 120b. Accordingly, the first UE 120a increases spectral efficiency on the sidelink channel. Moreover, the first UE 120a reduces network overhead and conserves processing resources by reusing resources reserved by the second UE 120b rather than reserving a new set of resources distinct from the first reserved set of resources.

As indicated above, FIG. 8 is provided as an example. Other examples may differ from what is described with respect to FIG. 8.

Figure 9:
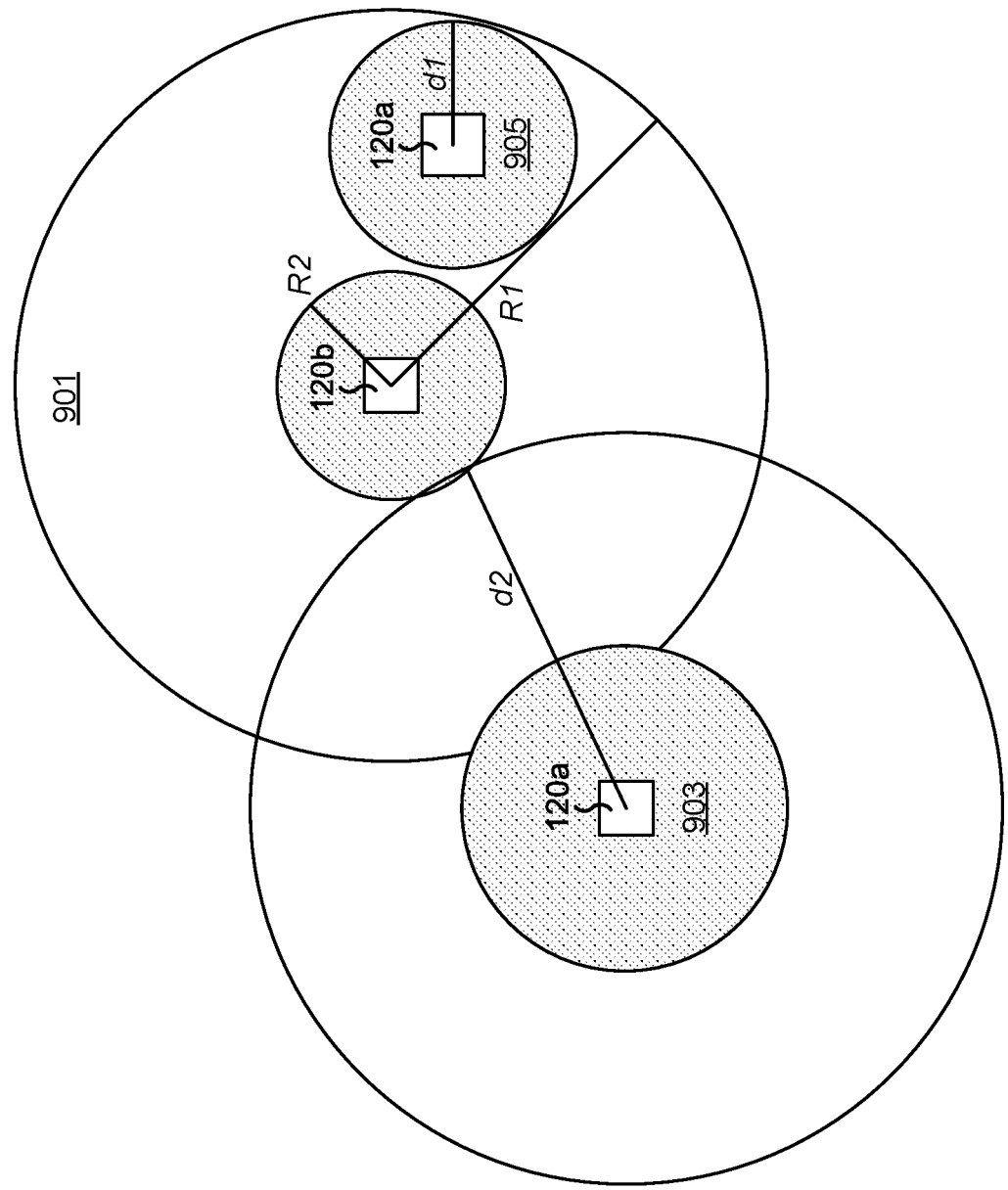

FIG. 9 is a diagram illustrating an example 900 associated with reusing sidelink resources, in accordance with the present disclosure. As shown in FIG. 9, example 900 includes a first reserved set of resources 901 that were reserved by SCI (e.g., SCI 0_1). For example, a first UE 120a may decode the SCI, which reserves resources 901, transmitted by at least one other UE (e.g., UE 120b). In some aspects, the UE 120a, the UE 120b, and other UEs may be included in a wireless network, such as wireless network 100. The UE 120a, the UE 120b, and other UEs may communicate on a sidelink channel (e.g., channel 310 as described in connection with FIG. 3). Although the description below focuses on the first UE 120a and the second UE 120b, the description similarly applies when the first UE 120a receives SCI from a plurality of second UEs.

Similar to example 800 of FIG. 8, example 900 includes the first UE 120a determining a first distance (e.g., represented by d2) based at least in part on an estimate of interference, between a data channel associated with the first UE 120a and a data channel associated with the second UE 120b; a coverage distance (e.g., represented by R1) associated with the first reserved set of resources 901 by decoding first control information; a propagation distance (e.g., represented by R2) associated with the first reserved set of resources 901 based at least in part on information obtained by decoding the first control information; and/or a second distance (e.g., represented by d1) based at least in part on an estimate of interference between a control channel associated with the first UE 120a and a control channel associated with the second UE 120b.

As shown in FIG. 9, the first UE 120a may determine resources 903 to reuse based at least in part on the first distance d2. In some aspects, when the first UE 120a is decoding first control information from a plurality of second UEs (and, accordingly, determining a plurality of first distances), the first UE 120a may select resources 903 based at least in part on reducing one or more of the first distances.

Accordingly, the first UE 120a may transmit second control information (e.g., SCI1) associated with the first set of reserved resources 901 before transmitting a message using resources 903. For example, the first UE 120a may reserve at least some of the first set of reserved resources that will be reused for transmitting the message. In some aspects, the second control information includes an indication that the first reserved set of resources 901 are reused from the second UE 120*b*. For example, the second control information may include a field and/or a bit, among other examples, indicating that the resources 903 are reused.

In some aspects, the first UE 120*a* may transmit the second control information on a different sub-channel than a sub-channel used to receive the first control information. Accordingly, the first UE 120*a* may reuse resources 903 at least excluding the sub-channel used to receive the first control information.

Generally, SCI1 is transmitted in a lowest sub-channel within a set of resources reserved by the SCI1. However, in some aspects, the first UE 120*a* may transmit the second control information on a different sub-channel than a first sub-channel within the first set of reserved resources 901, such that the first UE 120*a* does not exclude the sub-channel used to receive the first control information from reuse. Accordingly, the first UE 120*a* may include an indication of the first sub-channel in the second control information. For example, the first UE 120*a* may receive the first control information on sub-channel 1 and then transmit the second control information on sub-channel 2, but including an indication that sub-channel 1 is also reserved (at least in part) by the second control information. Additionally, or alternatively, the first UE 120*a* may transmit the second control information on a different sub-channel, selected using one or more rules, than a first sub-channel within the first set of reserved resources 901. Accordingly, the first UE 120*a* may not include an indication of the first sub-channel in the second control information. For example, the first UE 120*a* may receive the first control information on sub-channel 2 and then transmit the second control information on sub-channel 4 when a stored rule (e.g., programmed and/or otherwise preconfigured into the first UE 120*a*, the second UE 120*b*, and other UEs) indicates that control information may be included in any sub-channel where the modulus with two is zero. Other examples may include different rules (e.g., only the lowest and second-lowest sub-channels may include the control information). In some aspects, the rule may be received from a base station (e.g., base station 110) using a radio resource control (RRC) configuration.

As an alternative, the first UE 120*a* may transmit the second control information on a same sub-channel as used to receive the first control information. Accordingly, at least some content of the second control information is duplicated from the first control information to avoid interference. For example, the first UE 120*a* may use the same priority, same format for additional control information (e.g., SCI2), and/or same DMRS pattern, among other examples, as the second UE 120*b*.

As further shown in FIG. 9, the first UE 120*a* may instead determine resources 905 to reuse based at least in part on the first distance d2 and the second distance d1. In some aspects, when the first UE 120*a* is decoding first control information from a plurality of second UEs (and, accordingly, determining a plurality of first distances), the first UE 120*a* may select resources 905 based at least in part on reducing one or more of the first distances and the second distances.

In some aspects, the first UE 120*a* may refrain from transmitting control information (e.g., SCI1). For example, by including resources 905 within the first reserved set of resources 901, the first UE 120*a* may use the first control information to reserve resources 905 and skip directly to transmitting additional control information (e.g., SCI2) based at least in part on the first control information.

The first UE 120*a* may reserve different portions of the first reserved set of resources (e.g., resources 903 and/or resources 905) separately for first transmissions, retransmissions, and final transmissions. In one example, the first UE 120*a* may determine resources 903 to reuse, when transmitting in a time period associated with the first transmission, based at least in part on the first distance d2, and determine resources 905 to reuse, when transmitting in a time period associated with the retransmission, based at least in part on the first distance d2 and the second distance d1. In another example, the first UE 120*a* may determine resources 905 to reuse, when transmitting in a time period associated with the first transmission, based at least in part on the first distance d2 and the second distance d1, and determine resources 903 to reuse, when transmitting in a time period associated with the retransmission, based at least in part on the first distance d2.

Additionally, or alternatively, the first UE 120*a* may transmit second control information for reserving resources associated with the first transmission, and refrain from transmitting second control information for reserving resources associated with the retransmission. Similarly, the first UE 120*a* may refrain from transmitting second control information for reserving resources associated with the first transmission, and transmit second control information for reserving resources associated with the retransmission. Additionally, or alternatively, the second control information may differ when reserving resources associated with the first transmission as compared with reserving resources associated with the retransmission. In one example, the first UE 120*a* may transmit the second control information, on a same sub-channel as used to receive the first control information, for reserving resources associated with the first transmission, and transmit the second control information, on a different sub-channel as used to receive the first control information, for reserving resources associated with the retransmission.

In some aspects, the first UE 120*a* may not reuse resources in a time period associated with a final transmission within the first reserved set of resources. For example, as described in connection with FIG. 8, the first UE 120*a* may determine a transmit power, for transmitting within a time period associated with the final transmission, as zero. Additionally, or alternatively, the first UE 120*a* may determine a portion of the first reserved set of resources to reuse, for transmitting within a time period associated with the final transmission, as empty or zero.

Examples 800 and 900 may be combined. For example, the first UE 120*a* may determine which resources to reuse (e.g., resources 903 and/or resources 905) as well as a transmit power for using in those resources. As described above, the first UE 120*a* may determine which resources to reuse and a transmit power for reuse separately for first transmissions, retransmissions, and final transmissions.

By using techniques as described in connection with FIG. 9, the first UE 120*a* reuses resources on a sidelink channel reserved by the second UE 120*b*. Accordingly, the first UE 120*a* increases spectral efficiency on the sidelink channel. Moreover, the first UE 120*a* reduces network overhead and conserves processing resources by reusing resources reserved by the second UE 120*b* rather than reserving a new set of resources distinct from the first reserved set of resources. In some aspects, the first UE 120*a* may further conserve signaling overhead by reusing the first control information transmitted by the second UE 120b rather than encoding and transmitting new control information.

As indicated above, FIG. 9 is provided as an example. Other examples may differ from what is described with respect to FIG. 9.

Figure 10:
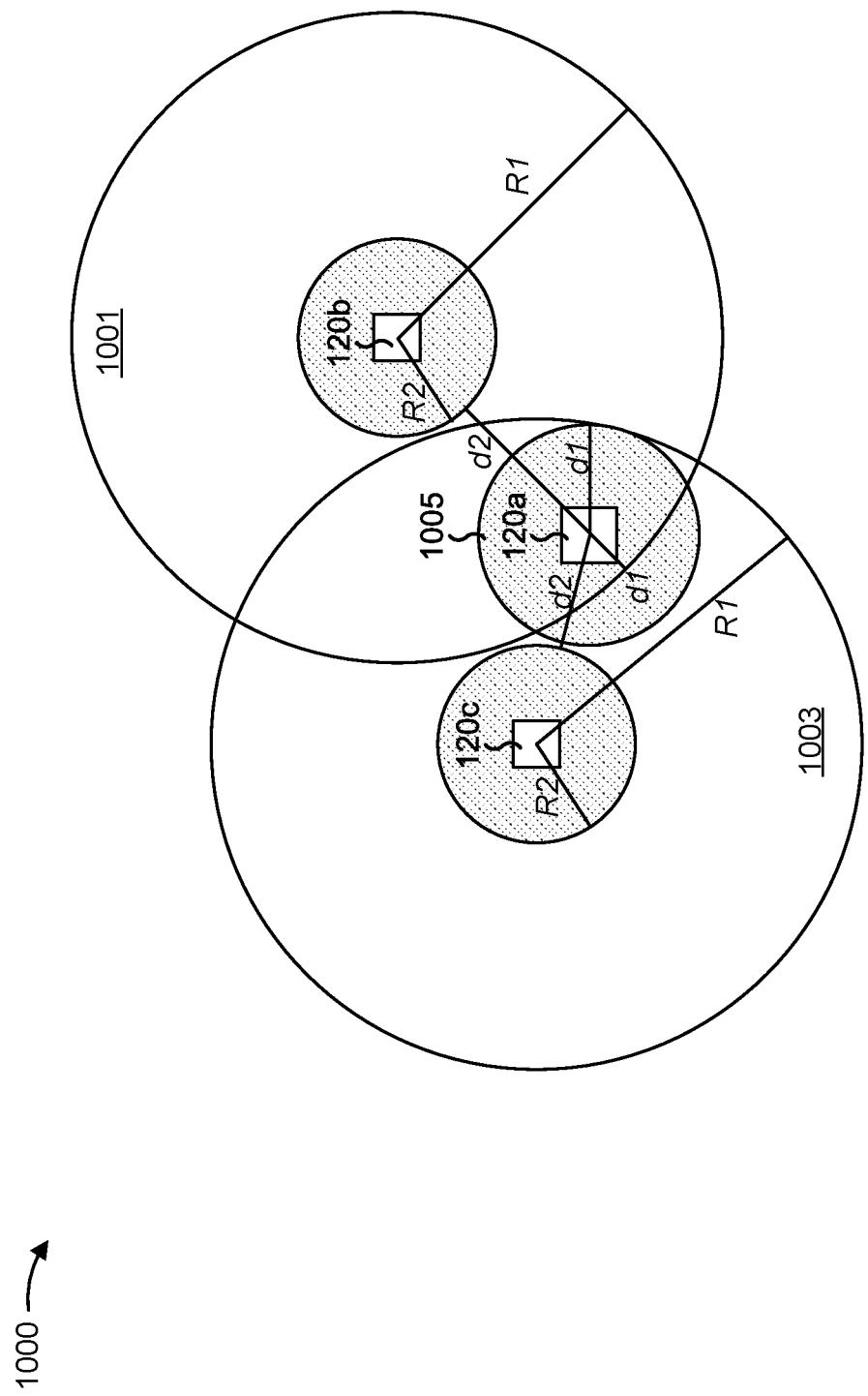

FIG. 10 is a diagram illustrating an example 1000 associated with reusing sidelink resources, in accordance with the present disclosure. As shown in FIG. 10, example 1000 includes a first reserved set of resources 1001 that were reserved by SCI (e.g., SCI 0_1) and a second reserved set of resources 1003 that were reserved by SCI (e.g., SCI 0_1). For example, a first UE 120a may decode the SCI, which reserves resources 1001, transmitted by at least one other UE (e.g., a second UE 120b and a third UE 120c in example 1000). In some aspects, the UE 120a, the plurality of second UEs, and other UEs may be included in a wireless network, such as wireless network 100. The UE 120a, the second UE 120b, the third UE 120c, and other UEs may communicate on a sidelink channel (e.g., channel 310 as described in connection with FIG. 3).

As shown in FIG. 10, and similar to example 800 of FIG. 8, example 1000 includes the first UE 120a determining a first distance (e.g., represented by d2) based at least in part on an estimate of interference, between a data channel associated with the first UE 120a and a data channel associated with the second UE 120b; a coverage distance (e.g., represented by R1) associated with the first reserved set of resources 1001 by decoding first control information; a propagation distance (e.g., represented by R2) associated with the first reserved set of resources 1001 based at least in part on information obtained by decoding the first control information; and/or a second distance (e.g., represented by d1) based at least in part on an estimate of interference between a control channel associated with the first UE 120a and a control channel associated with the second UE 120b. Additionally, the first UE 120a may determine a first distance (e.g., represented by d2) based at least in part on an estimate of interference, between a data channel associated with the first UE 120a and a data channel associated with the third UE 120c; a coverage distance (e.g., represented by R1) associated with the second reserved set of resources 1003 by decoding second control information; a propagation distance (e.g., represented by R2) associated with the second reserved set of resources 1003 based at least in part on information obtained by decoding the second control information; and/or a second distance (e.g., represented by d1) based at least in part on an estimate of interference between a control channel associated with the first UE 120a and a control channel associated with the third UE 120c.

As shown in FIG. 10, and as described in connection with FIG. 9, the first UE 120a may determine resources 1005 to reuse based at least in part on the first distance d2 associated with the second UE 120b, the second distance d1 associated with the second UE 120b, the first distance d2 associated with the third UE 120c, and the second distance d1 associated with the third UE 120c. In some aspects, the first UE 120a may select resources 1005 based at least in part on reducing one or more of the first distances d2 and the second distances d1.

Accordingly, as described in connection with FIG. 9, the first UE 120a may transmit new control information (e.g., SCI1) associated with the first set of reserved resources 1001 before transmitting a message on resources 1005. As an alternative, and as described in connection with FIG. 9, the first UE 120a may refrain from transmitting new control information (e.g., SCI1). For example, by including resources 1005 within the first reserved set of resources 1001, the first UE 120a may use the first control information and/or the second control information and skip directly to transmitting additional control information (e.g., SCI2) based at least in part on the first control information and/or the second control information.

The first UE 120a may reserve different portions of the first reserved set of resources 1001 (e.g., resources 1005) separately for first transmissions, retransmissions, and final transmissions. In one example, the first UE 120a may determine resources 1005 to reuse, when transmitting in a time period associated with the first transmission, based at least in part on the first distances d2 and the second distances d1, and determine different resources to reuse, when transmitting in a time period associated with the retransmission, based at least in part on the first distances d2. In another example, the first UE 120a may determine resources to reuse, when transmitting in a time period associated with the first transmission, based at least in part on the first distances d2, and determine resources 1005 to reuse, when transmitting in a time period associated with the retransmission, based at least in part on the first distances d2 and the second distances d1.

Additionally, or alternatively, the first UE 120a may transmit new control information for reserving resources associated with the first transmission and refrain from transmitting new control information for reserving resources associated with the retransmission. Similarly, the first UE 120a may refrain from transmitting new control information for reserving resources associated with the first transmission and transmit new control information for reserving resources associated with the retransmission. Additionally, or alternatively, the new control information may differ when the first UE 120a is reserving resources associated with the first transmission as compared with reserving resources associated with the retransmission. In one example, the first UE 120a may transmit the new control information, on a same sub-channel as used to receive the first control information and/or the second control information, for reserving resources associated with the first transmission, and transmit the new control information, on a different sub-channel than used to receive the first control information and/or the second control information, for reserving resources associated with the retransmission.

In some aspects, the first UE 120a may not reuse resources in a time period associated with a final transmission within the first reserved set of resources. For example, as described in connection with FIG. 8, the first UE 120a may determine a transmit power, for transmitting within a time period associated with the final transmission, as zero. Additionally, or alternatively, the first UE 120a may determine a portion of the first reserved set of resources to reuse, for transmitting within a time period associated with the final transmission, as empty or zero.

Examples 800 and 1000 may be combined. For example, the first UE 120a may determine which resources to reuse (e.g., resources 1005) as well as a transmit power for using in those resources. As described above, the first UE 120a may determine which resources to reuse and a transmit power for reuse separately for first transmissions, retransmissions, and final transmissions.

By using techniques as described in connection with FIG. 10, the first UE 120a reuses resources on a sidelink channel reserved by a plurality of second UEs. Accordingly, the first UE 120a increases spectral efficiency on the sidelink channel. Moreover, the first UE 120a reduces network overhead and conserves processing resources by reusing resources reserved by the plurality of second UEs rather than reserving a new set of resources distinct from the first reserved set of resources. In some aspects, the first UE 120a may further conserve signaling overhead by reusing the first control information transmitted by one or more of the second UEs rather than encoding and transmitting new control information.

As indicated above, FIG. 10 is provided as an example. Other examples may differ from what is described with respect to FIG. 10.

Figure 11:
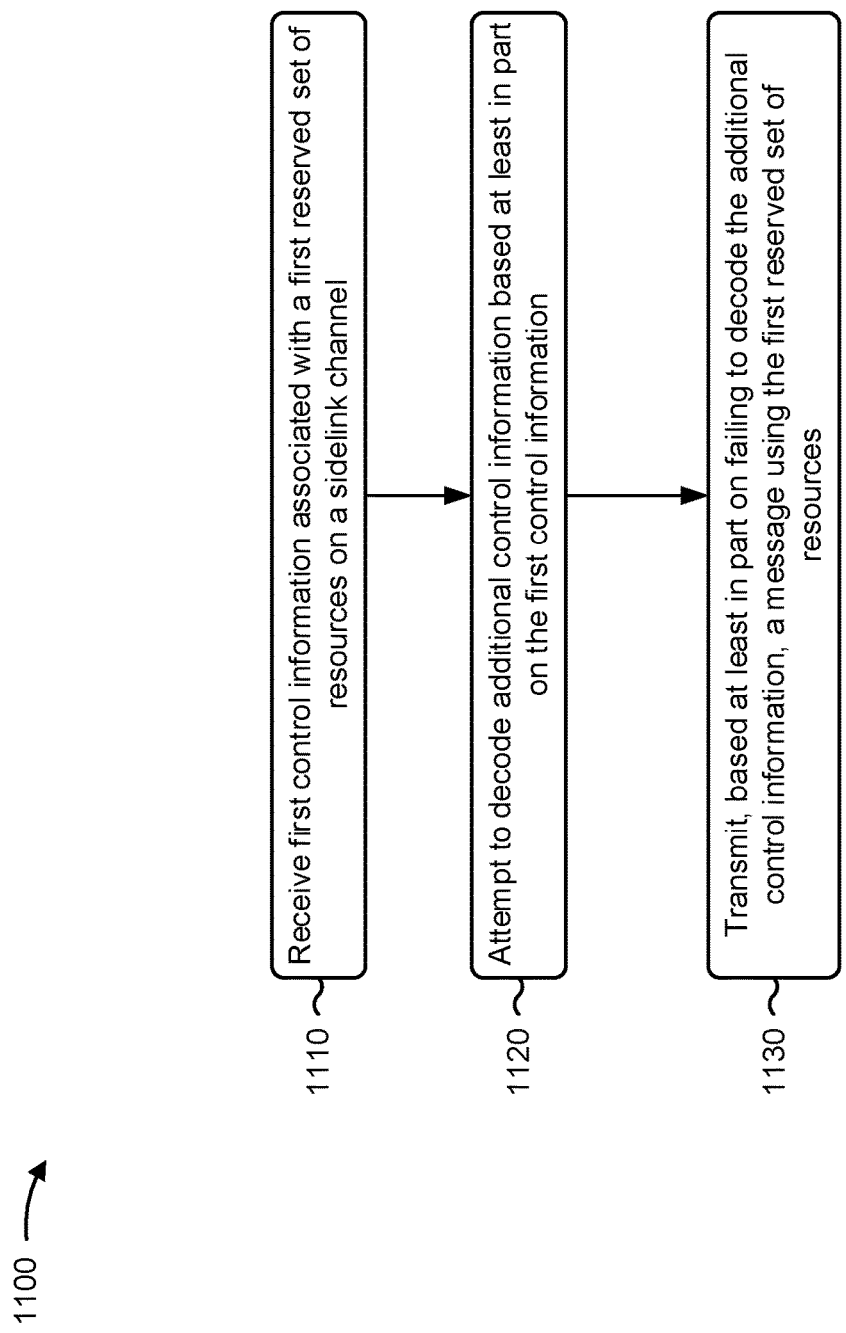
FIG. 11 is a diagram illustrating an example process associated with reusing sidelink resources, in accordance with the present disclosure.

FIG. 11 is a diagram illustrating an example process 1100 performed, for example, by a first UE, in accordance with the present disclosure. Example process 1100 is an example where the UE (e.g., UE 120 and/or apparatus 1200 of FIG. 12) performs operations associated with reusing sidelink resources.

As shown in FIG. 11, in some aspects, process 1100 may include receiving, from at least one second UE (e.g., another UE 120 and/or another apparatus 1200), first control information associated with a first reserved set of resources on a sidelink channel (block 1110). For example, the first UE (e.g., using reception component 1202, depicted in FIG. 12) may receive, from at least one second UE, first control information associated with a first reserved set of resources on a sidelink channel, as described herein.

As further shown in FIG. 11, in some aspects, process 1100 may include attempting to decode additional control information based at least in part on the first control information (block 1120). For example, the first UE (e.g., using reception component 1202) may attempt to decode additional control information based at least in part on the first control information, as described herein.

As further shown in FIG. 11, in some aspects, process 1100 may include transmitting, based at least in part on failing to decode the additional control information, a message using the first reserved set of resources (block 1130). For example, the UE (e.g., using transmission component 1204) may transmit, based at least in part on failing to decode the additional control information, the message using the first reserved set of resources, as described herein.

Process 1100 may include additional aspects, such as any single aspect or any combination of aspects described below and/or in connection with one or more other processes described elsewhere herein.

In a first aspect, the first control information includes SCI.

In a second aspect, alone or in combination with the first aspect, process 1100 further includes determining (e.g., using determination component 1208, depicted in FIG. 12) a subset of unoccupied resources within the first reserved set of resources based at least in part on failing to decode additional control information.

In a third aspect, alone or in combination with one or more of the first and second aspect, process 1100 further includes determining (e.g., using determination component 1208), based on one or more resources dimensions, at least one first distance between the first UE and the at least one second UE, such that the message is transmitted with a first transmit power based at least in part on the first distance.

In a fourth aspect, alone or in combination with one or more of the first through third aspects, determining the at least one first distance includes measuring (e.g., using measurement component 1210, depicted in FIG. 12) a reference signal associated with the first control information, and determining (e.g., using determination component 1208) a pathloss estimate to the at least one second UE based at least in part on the measuring, such that the at least one first distance is determined based at least in part on the pathloss estimate.

In a fifth aspect, alone or in combination with one or more of the first through fourth aspects, process 1100 further includes determining (e.g., using determination component 1208) a coverage distance associated with the first reserved set of resources by decoding the first control information, such that the at least one first distance is determined based at least in part on the coverage distance.

In a sixth aspect, alone or in combination with one or more of the first through fifth aspects, the coverage distance is further determined based at least in part on a physical distance between the first UE and the at least one second UE.

In a seventh aspect, alone or in combination with one or more of the first through sixth aspects, process 1100 further includes estimating (e.g., using determination component 1208) a propagation distance associated with the first reserved set of resources based at least in part on information obtained by decoding the first control information.

In an eighth aspect, alone or in combination with one or more of the first through seventh aspects, the at least one first distance is determined based at least in part on an estimate of interference, between a data channel associated with the first UE and at least one data channel associated with the at least one second UE, using the first reserved set of resources.

In a ninth aspect, alone or in combination with one or more of the first through eighth aspects, process 1100 further includes determining (e.g., using determination component 1208), based on the one or more resource dimensions, a second distance based at least in part on an estimate of interference between a control channel associated with the first UE and at least one control channel associated with the at least one second UE.

In a tenth aspect, alone or in combination with one or more of the first through ninth aspects, the message is transmitted with a transmit power based at least in part on the second distance.

In an eleventh aspect, alone or in combination with one or more of the first through tenth aspects, process 1100 further includes determining (e.g., using determination component 1208), based on the one or more resource dimensions, a third distance based at least in part on an estimate of interference between a data channel associated with the first UE and at least one data channel used for retransmission and associated with the at least one second UE, such that the message is transmitted with a second transmit power based at least in part on the at least one second distance when transmitted in a time period associated with the retransmission.

In a twelfth aspect, alone or in combination with one or more of the first through eleventh aspects, the message is not transmitted in a time period associated with a final transmission within the first reserved set of resources.

In a thirteenth aspect, alone or in combination with one or more of the first through twelfth aspects, the message is transmitted using one or more resources within the first reserved set of resources, and the one or more resources are determined based at least in part on the first transmit power.

In a fourteenth aspect, alone or in combination with one or more of the first through thirteenth aspects, process 1100 further includes receiving (e.g., using reception component 1202), from at least one third UE, second control information associated with a second reserved set of resources on the sidelink channel, and determining (e.g., using determination component 1208), based on the one or more resource dimensions, at least one second distance between the first UE and the at least one third UE, such that the first transmit power is further based at least in part on the second distance.

In a fifteenth aspect, alone or in combination with one or more of the first through fourteenth aspects, process 1100 further includes determining (e.g., using determination component 1208), based on the one or more resource dimensions, at least one third distance based at least in part on an estimate of interference between a data channel associated with the first UE and at least one data channel used for retransmission and associated with the at least one second UE, and determining (e.g., using determination component 1208), based on the one or more resource dimensions, at least one fourth distance based at least in part on an estimate of interference between a data channel associated with the first UE and at least one data channel used for retransmission and associated with the at least one third UE, such that the message is transmitted with a second transmit power based at least in part on the at least one third distance and the at least one fourth distance, when transmitted in a time period associated with the retransmission.

In a sixteenth aspect, alone or in combination with one or more of the first through fifteenth aspects, process 1100 further includes determining (e.g., using determination component 1208), based on the one or more resource dimensions, at least one fifth distance based at least in part on an estimate of interference between a control channel associated with the first UE and at least one control channel used for retransmission associated with the at least one second UE, and determining (e.g., using determination component 1208), based on the one or more resource dimensions, at least one sixth distance based at least in part on an estimate of interference between a control channel associated with the first UE and at least one control channel used for retransmission associated with the at least one third UE, such that the second transmit power is further based at least in part on the at least one fifth distance and the at least one sixth distance.

In a seventeenth aspect, alone or in combination with one or more of the first through sixteenth aspects, process 1100 further includes transmitting (e.g., using transmission component 1204, depicted in FIG. 12) second control information associated with the first set of reserved resources before transmitting the message.

In an eighteenth aspect, alone or in combination with one or more of the first through seventeenth aspects, the second control information includes an indication that the first reserved set of resources are reused from the at least one second UE.

In a nineteenth aspect, alone or in combination with one or more of the first through eighteenth aspects, the second control information is transmitted on a different sub-channel than a sub-channel used to receive the first control information associated with the first reserved set of resources.

In a twentieth aspect, alone or in combination with one or more of the first through nineteenth aspects, the second control information is transmitted on a different sub-channel than a first sub-channel within the first set of reserved resources, and the second control information includes an indication of the first sub-channel.

In a twenty-first aspect, alone or in combination with one or more of the first through twentieth aspects, the second control information is transmitted on a different sub-channel, selected using one or more rules, than a first sub-channel within the first set of reserved resources.

In a twenty-second aspect, alone or in combination with one or more of the first through twenty-first aspects, the second control information is transmitted on a same sub-channel as used to receive the first control information, and at least some content of the second control information is duplicated from the first control information.

In a twenty-third aspect, alone or in combination with one or more of the first through twenty-second aspects, process 1100 further includes receiving (e.g., using reception component 1202), from at least one third UE, second control information associated with a second reserved set of resources on the sidelink channel; determining (e.g., using determination component 1208), based on the one or more resource dimensions, at least one second distance based at least in part on an estimate of interference between a data channel associated with the first UE and at least one data channel associated with the at least one third UE; determining (e.g., using determination component 1208), based on the one or more resource dimensions, at least one third distance based at least in part on an estimate of interference between a control channel associated with the first UE and at least one control channel associated with the at least one second UE; and determining (e.g., using determination component 1208), based on the one or more resource dimensions, at least one fourth distance based at least in part on an estimate of interference between a control channel associated with the first UE and at least one control channel associated with the at least one third UE, such that the first transmit power is further based at least in part on the at least one second distance, the at least one third distance, and the at least one fourth distance.

In a twenty-fourth aspect, alone or in combination with one or more of the first through twenty-third aspects, process 1100 further includes determining (e.g., using determination component 1208), based on the one or more resource dimensions, at least one fifth distance based at least in part on an estimate of interference between a data channel associated with the first UE and at least one data channel used for retransmission and associated with the at least one second UE, and determining (e.g., using determination component 1208), based on the one or more resource dimensions, at least one sixth distance based at least in part on an estimate of interference between a data channel associated with the first UE and at least one data channel used for retransmission and associated with the at least one third UE, such that the message is transmitted with a second transmit power based at least in part on the at least one fifth distance and the at least one sixth distance, when transmitted in a time period associated with the retransmission.

In a twenty-fifth aspect, alone or in combination with one or more of the first through twenty-fourth aspects, process 1100 further includes determining (e.g., using determination component 1208), based on the one or more resource dimensions, at least one seventh distance based at least in part on an estimate of interference between a control channel associated with the first UE and at least one control channel used for retransmission associated with the at least one second UE, and determining (e.g., using determination component 1208), based on the one or more resource dimensions, at least one eighth distance based at least in part on an estimate of interference between a control channel associated with the first UE and at least one control channel used for retransmission associated with the at least one third UE, such that the second transmit power is further based at least in part on the at least one seventh distance and the at least one eighth distance.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
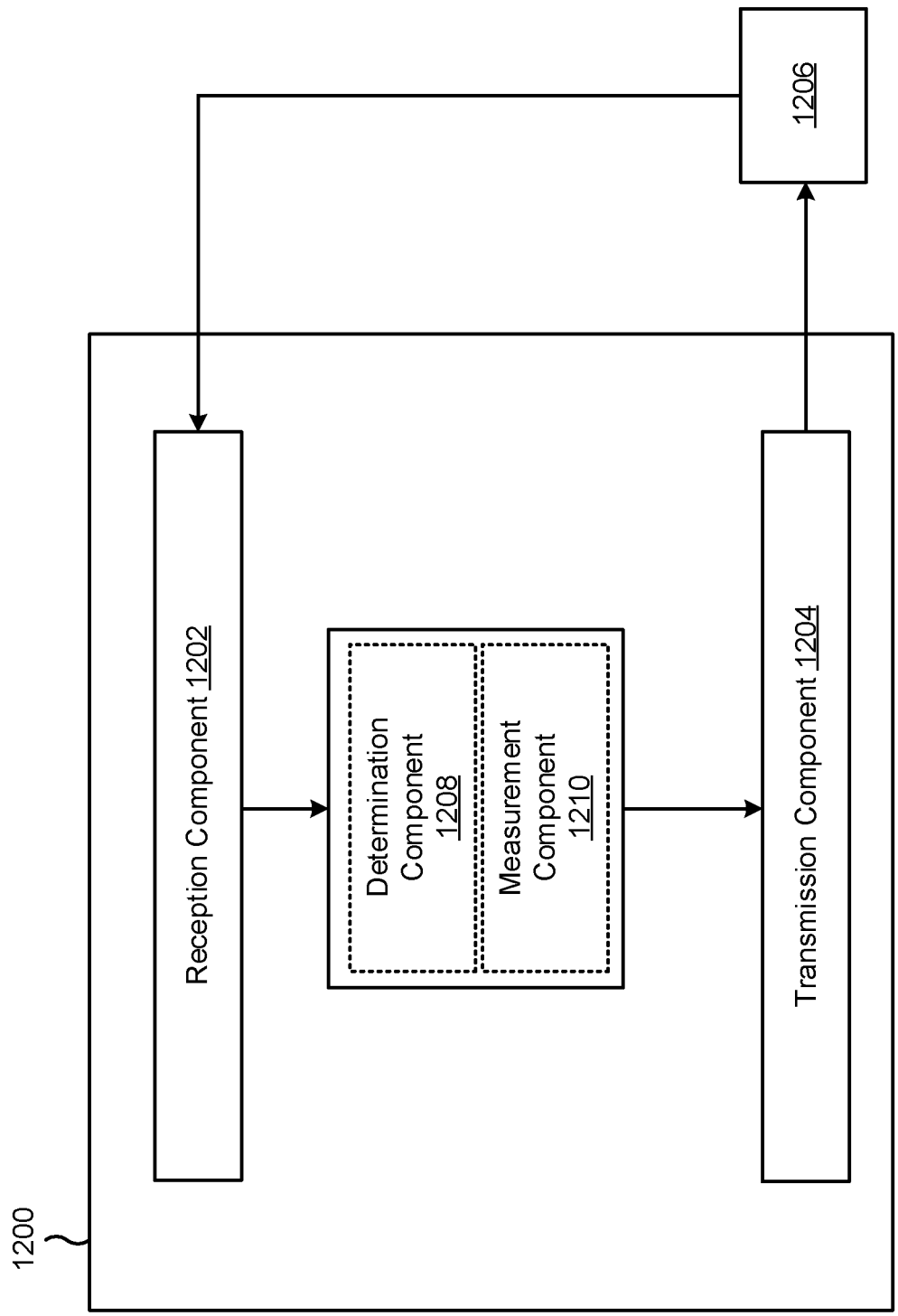
FIGS. 12 and 13 are diagrams of example apparatuses for wireless communication, in accordance with the present disclosure.

FIG. 12 is a block diagram of an example apparatus 1200 for wireless communication. The apparatus 1200 may be a first UE, or a first UE may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include one or more of a determination component 1208 and/or a measurement component 1210, among other examples.

In some aspects, the apparatus 1200 may be configured to perform one or more operations described herein in connection with FIGS. 8-10. Additionally, or alternatively, the apparatus 1200 may be configured to perform one or more processes described herein, such as process 1100 of FIG. 11, or a combination thereof. In some aspects, the apparatus 1200 and/or one or more components shown in FIG. 12 may include one or more components of the UE described above in connection with FIG. 2. Additionally, or alternatively, one or more components shown in FIG. 12 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a demodulator, a MIMO detector, a receive processor, a controller/processor, a memory, or a combination thereof, of the UE described above in connection with FIG. 2.

The transmission component 1204 may transmit communications, such as reference signals, control information, data communications, or a combination thereof, to the apparatus 1206. In some aspects, one or more other components of the apparatus 1200 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modulator, a transmit MIMO processor, a transmit processor, a controller/processor, a memory, or a combination thereof, of the UE described above in connection with FIG. 2. In some aspects, the transmission component 1204 may be co-located with the reception component 1202 in a transceiver.

In some aspects, the reception component 1202 may receive, from the apparatus 1206, first control information associated with a first reserved set of resources on a sidelink channel. The reception component 1202 may further attempt to decode additional control information based at least in part on the first control information Accordingly, transmission component 1204 may transmit, based at least in part on the reception component 1202 failing to decode the additional control information, a message using the first reserved set of resources. For example, the reception component 1202 may receive the additional control information with a quality and/or reliability that is too low for decoding or may not receive the additional control information at all. In some aspects, the determination component 1208 may determine a subset of unoccupied resources within the first reserved set of resources by failing to decode additional control information. The determination component 1208 may include a receive processor, a transmit processor, a controller/processor, a memory, or a combination thereof, of the UE described above in connection with FIG. 2.

In some aspects, the determination component 1208 may further determine, based on one or more resource dimensions, at least one first distance between the apparatus 1200 and the apparatus 1206. Accordingly, the transmission component 1204 may transmit the message with a first transmit power based at least in part on the first distance. In some aspects, the determination component 1208 may determine the at least one first distance based on the measurement component 1210 measuring a reference signal associated with the first control information such that the determination component 1208 determines a pathloss estimate to the apparatus 1206 based at least in part on the measurement(s), such that the at least one first distance is determined based at least in part on the pathloss estimate. The measurement component 1210 may include one or more antennas, a demodulator, a MIMO detector, a receive processor, a controller/processor, a memory, or a combination thereof, of the UE described above in connection with FIG. 2.

In some aspects, the determination component 1208 may determine a coverage distance associated with the first reserved set of resources by decoding the first control information. Accordingly, the determination component 1208 may determine the at least one first distance based at least in part on the coverage distance.

Additionally, or alternatively, the determination component 1208 may estimate a propagation distance associated with the first reserved set of resources based at least in part on information obtained by decoding the first control information.

In some aspects, the determination component 1208 may determine, based on the one or more resource dimensions, a second distance based at least in part on an estimate of interference between a control channel associated with the apparatus 1200 and at least one control channel associated with the apparatus 1206.

Additionally, the determination component 1208 may determine, based on the one or more resource dimensions, a third distance based at least in part on an estimate of interference between a data channel associated with the apparatus 1200 and at least one data channel used for retransmission and associated with the apparatus 1206. Accordingly, the transmission component 1204 may transmit the message with a second transmit power based at least in part on the at least one second distance when transmitted in a time period associated with the retransmission.

In some aspects, the reception component 1202 may receive, from an additional apparatus (e.g., another UE), second control information associated with a second reserved set of resources on the sidelink channel. Accordingly, the determination component 1208 may determine, based on the one or more resource dimensions, at least one second distance between the apparatus 1200 and the additional apparatus. The transmission component 1204 may transmit the message with the first transmit power further based at least in part on the second distance.

In some aspects, the determination component 1208 may further determine, based on the one or more resource dimensions, at least one third distance based at least in part on an estimate of interference between a data channel associated with the apparatus 1200 and at least one data channel used for retransmission and associated with the apparatus 1206. The determination component 1208 may further determine, based on the one or more resource dimensions, at least one fourth distance based at least in part on an estimate of interference between a data channel associated with the apparatus 1200 and at least one data channel used for retransmission and associated with the additional apparatus. Accordingly, the transmission component 1204 may transmit the message with a second transmit power further based at least in part on the at least one third distance and the at least one fourth distance, when transmitted in a time period associated with the retransmission.

In some aspects, determination component 1208 may further determine, based on the one or more resource dimensions, at least one fifth distance based at least in part on an estimate of interference between a control channel associated with the apparatus 1200 and at least one control channel used for retransmission associated with the apparatus 1206. The determination component 1208 may further determine, based on the one or more resource dimensions, at least one sixth distance based at least in part on an estimate of interference between a control channel associated with the apparatus 1200 and at least one control channel used for retransmission associated with the additional apparatus. Accordingly, the transmission component 1204 may transmit the message with the second transmit power further based at least in part on the at least one fifth distance and the at least one sixth distance, when transmitted in a time period associated with the retransmission.

In some aspects, the determination component 1208 may determine, based on the one or more resource dimensions, at least one second distance based at least in part on an estimate of interference between a data channel associated with the apparatus 1200 and at least one data channel associated with the additional apparatus. The determination component 1208 may further determine, based on the one or more resource dimensions, at least one third distance based at least in part on an estimate of interference between a control channel associated with the apparatus 1200 and at least one control channel associated with the apparatus 1206. The determination component 1208 may further determine, based on the one or more resource dimensions, at least one fourth distance based at least in part on an estimate of interference between a control channel associated with the apparatus 1200 and at least one control channel associated with the additional apparatus. Accordingly, the transmission component 1204 may transmit the message with the first transmit power further based at least in part on the at least one second distance, the at least one third distance, and the at least one fourth distance.

In some aspects, the determination component 1208 may determine, based on the one or more resource dimensions, at least one fifth distance based at least in part on an estimate of interference between a data channel associated with the apparatus 1200 and at least one data channel used for retransmission and associated with apparatus 1206. The determination component 1208 may further determine, based on the one or more resource dimensions, at least one sixth distance based at least in part on an estimate of interference between a data channel associated with the apparatus 1200 and at least one data channel used for retransmission and associated with the additional apparatus. Accordingly, the transmission component 1204 may transmit the message with the second transmit power further based at least in part on the at least one fifth distance and the at least one sixth distance, when transmitted in a time period associated with the retransmission.

In some aspects, the determination component 1208 may determine, based on the one or more resource dimensions, at least one seventh distance based at least in part on an estimate of interference between a control channel associated with the apparatus 1200 and at least one control channel used for retransmission associated with the apparatus 1206. The determination component 1208 may further determine, based on the one or more resource dimensions, at least one eighth distance based at least in part on an estimate of interference between a control channel associated with the apparatus 1200 and at least one control channel used for retransmission associated with the additional apparatus. Accordingly, the transmission component 1204 may transmit the message with the second transmit power further based at least in part on the at least one seventh distance and the at least one eighth distance.

In some aspects, the transmission component 1204 may transmit new control information associated with the first set of reserved resources before transmitting the message.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

Figure 13:
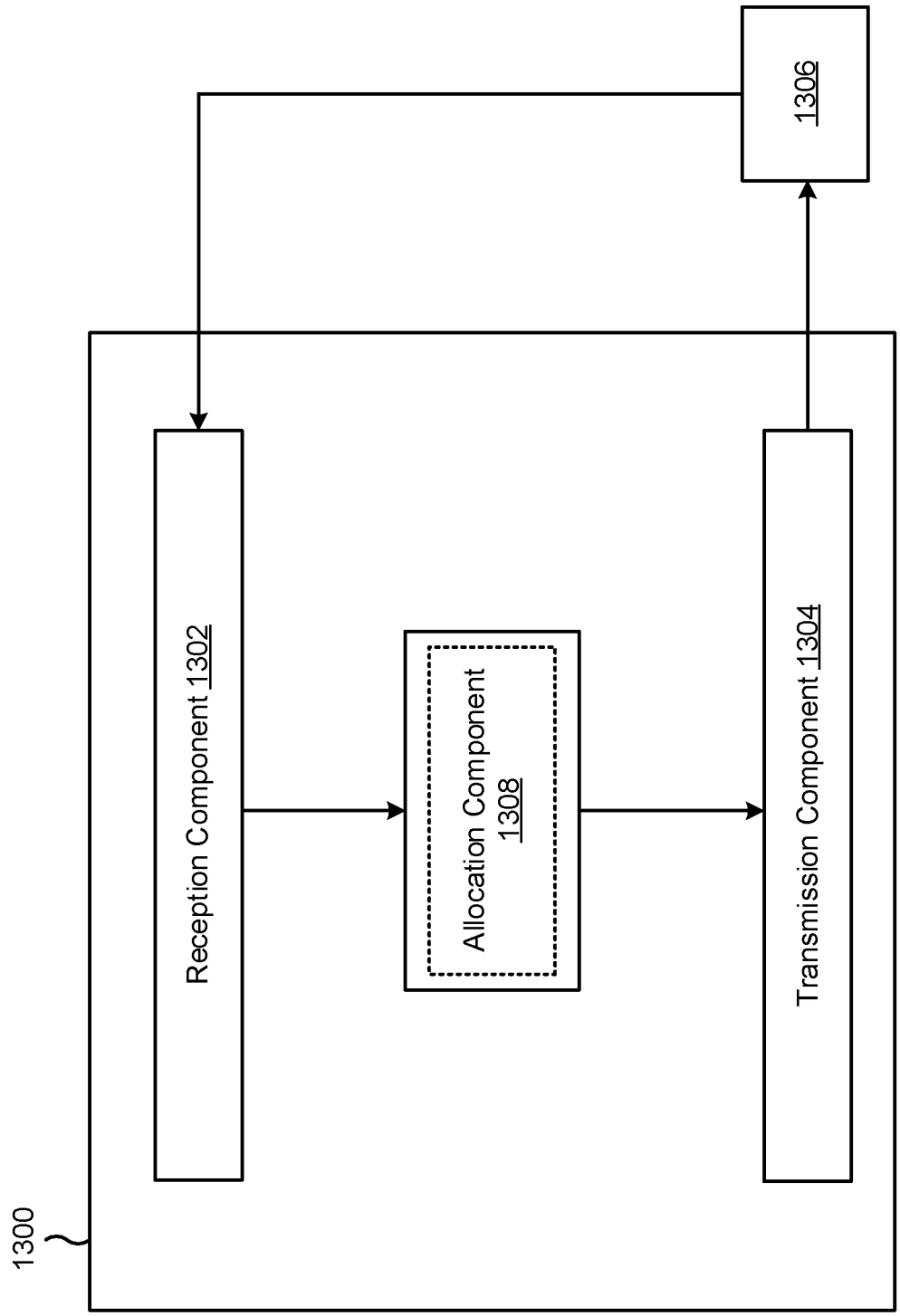

FIG. 13 is a block diagram of an example apparatus 1300 for wireless communication. The apparatus 1300 may be a base station, or a base station may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302 and the transmission component 1304. As further shown, the apparatus 1300 may include an allocation component 1308, among other examples.

In some aspects, the apparatus 1300 may be configured to perform one or more operations described herein in connection with FIGS. 8-10. Additionally, or alternatively, the apparatus 1300 may be configured to perform one or more processes described herein, or a combination thereof. In some aspects, the apparatus 1300 and/or one or more components shown in FIG. 13 may include one or more components of the base station described above in connection with FIG. 2. Additionally, or alternatively, one or more components shown in FIG. 13 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1300. In some aspects, the reception component 1302 may include one or more antennas, a demodulator, a MIMO detector, a receive processor, a controller/processor, a memory, or a combination thereof, of the base station described above in connection with FIG. 2.

The transmission component 1304 may transmit communications, such as reference signals, control information, data communications, or a combination thereof, to the apparatus 1306. In some aspects, one or more other components of the apparatus 1300 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modulator, a transmit MIMO processor, a transmit processor, a controller/processor, a memory, or a combination thereof, of the base station described above in connection with FIG. 2. In some aspects, the transmission component 1304 may be co-located with the reception component 1302 in a transceiver.

In some aspects, the allocation component 1308 may allocate a set of resources to apparatus 1306 for use on a sidelink channel. For example, the set of resources may include a first set of reserved resources used by the apparatus 1306 (e.g., to reserve with control information), as described herein, or may include a larger pool of resources from which the apparatus 1306 selects the first set of reserved resources to use. The allocation component 1308 may include a receive processor, a transmit processor, a controller/processor, a memory, or a combination thereof, of the UE described above in connection with FIG. 2. In some aspects, the transmission component 1304 may transmit a grant of the allocation to the apparatus 1306.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

The following provides an overview of some Aspects of the present disclosure:

Aspect 1: A method of wireless communication performed by a first user equipment (UE), comprising: receiving, from at least one second UE, first control information associated with a first reserved set of resources on a sidelink channel; attempting to decode additional control information based at least in part on the first control information; and transmitting, based at least in part on failing to decode the additional control information, a message using the first reserved set of resources.

Aspect 2: The method of Aspect 1, wherein the first control information includes sidelink control information.

Aspect 3: The method of any of Aspects 1 through 2, further comprising: determining a subset of unoccupied resources within the first reserved set of resources based at least in part on failing to decode additional control information.

Aspect 4: The method of any of Aspects 1 through 3, further comprising: determining, based on one or more resources dimensions, at least one first distance between the first UE and the at least one second UE, wherein the message is transmitted with a first transmit power based at least in part on the first distance.

Aspect 5: The method of Aspect 4, wherein determining the at least one first distance comprises: measuring a reference signal associated with the first control information; and determining a pathloss estimate to the at least one second UE based at least in part on the measuring, wherein the at least one first distance is determined based at least in part on the pathloss estimate.

Aspect 6: The method of any of Aspects 4 through 5, further comprising: determining a coverage distance associated with the first reserved set of resources by decoding the first control information, wherein the at least one first distance is determined based at least in part on the coverage distance.

Aspect 7: The method of Aspect 6, wherein the coverage distance is further determined based at least in part on a physical distance between the first UE and the at least one second UE.

Aspect 8: The method of any of Aspects 4 through 7, further comprising: estimating a propagation distance associated with the first reserved set of resources based at least in part on information obtained by decoding the first control information.

Aspect 9: The method of any of Aspects 4 through 8, wherein the at least one first distance is determined based at least in part on an estimate of interference, between a data channel associated with the first UE and at least one data channel associated with the at least one second UE, using the first reserved set of resources.

Aspect 10: The method of any of Aspects 4 through 9, further comprising: determining, based on the one or more resource dimensions, a second distance based at least in part on an estimate of interference between a control channel associated with the first UE and at least one control channel associated with the at least one second UE.

Aspect 11: The method of Aspect 10, wherein the message is transmitted with a transmit power based at least in part on the second distance.

Aspect 12: The method of any of Aspects 4 through 11, further comprising: determining, based on the one or more resource dimensions, at least one second distance based at least in part on an estimate of interference between a data channel associated with the first UE and at least one data channel used for retransmission and associated with the at least one second UE, wherein the message is transmitted with a second transmit power based at least in part on the at least on second distance when transmitted in a time period associated with the retransmission.

Aspect 13: The method of any of Aspects 4 through 12, wherein the message is not transmitted in a time period associated with a final transmission within the first reserved set of resources.

Aspect 14: The method of any of Aspects 4 through 13, wherein the message is transmitted using one or more resources within the first reserved set of resources, and wherein the one or more resources are determined based at least in part on the first transmit power.

Aspect 15: The method of any of Aspects 4 through 14, further comprising: receiving, from at least one third UE, second control information associated with a second reserved set of resources on the sidelink channel; and determining, based on the one or more resource dimensions, at least one second distance between the first UE and the at least one third UE, wherein the first transmit power is further based at least in part on the second distance.

Aspect 16: The method of Aspect 15, further comprising: determining, based on the one or more resource dimensions, at least one third distance based at least in part on an estimate of interference between a data channel associated with the first UE and at least one data channel used for retransmission and associated with the at least one second UE; and determining, based on the one or more resource dimensions, at least one fourth distance based at least in part on an estimate of interference between a data channel associated with the first UE and at least one data channel used for retransmission and associated with the at least one third UE, wherein the message is transmitted with a second transmit power based at least in part on the at least one third distance and the at least one fourth distance, when transmitted in a time period associated with the retransmission.

Aspect 17: The method of Aspect 16, further comprising: determining, based on the one or more resource dimensions, at least one fifth distance based at least in part on an estimate of interference between a control channel associated with the first UE and at least one control channel used for retransmission associated with the at least one second UE; and determining, based on the one or more resource dimensions, at least one sixth distance based at least in part on an estimate of interference between a control channel associated with the first UE and at least one control channel used for retransmission associated with the at least one third UE, wherein the second transmit power is further based at least in part on the at least one fifth distance and the at least one sixth distance.

Aspect 18: The method of any of Aspects 4 through 14, further comprising: receiving, from at least one third UE, second control information associated with a second reserved set of resources on the sidelink channel; determining, based on the one or more resource dimensions, at least one second distance based at least in part on an estimate of interference between a data channel associated with the first UE and at least one data channel associated with the at least one third UE; determining, based on the one or more resource dimensions, at least one third distance based at least in part on an estimate of interference between a control channel associated with the first UE and at least one control channel associated with the at least one second UE; and determining, based on the one or more resource dimensions, at least one fourth distance based at least in part on an estimate of interference between a control channel associated with the first UE and at least one control channel associated with the at least one third UE, wherein the first transmit power is further based at least in part on the at least one second distance, the at least one third distance, and the at least one fourth distance.

Aspect 19: The method of Aspect 18, further comprising: determining, based on the one or more resource dimensions, at least one fifth distance based at least in part on an estimate of interference between a data channel associated with the first UE and at least one data channel used for retransmission and associated with the at least one second UE; and determining, based on the one or more resource dimensions, at least one sixth distance based at least in part on an estimate of interference between a data channel associated with the first UE and at least one data channel used for retransmission and associated with the at least one third UE, wherein the message is transmitted with a second transmit power based at least in part on the at least one fifth distance and the at least one sixth distance, when transmitted in a time period associated with the retransmission.

Aspect 20: The method of Aspect 19, further comprising: determining, based on the one or more resource dimensions, at least one seventh distance based at least in part on an estimate of interference between a control channel associated with the first UE and at least one control channel used for retransmission associated with the at least one second UE; and determining, based on the one or more resource dimensions, at least one eighth distance based at least in part on an estimate of interference between a control channel associated with the first UE and at least one control channel used for retransmission associated with the at least one third UE, wherein the second transmit power is further based at least in part on the at least one seventh distance and the at least one eighth distance.

Aspect 21: The method of any of Aspects 1 through 20, further comprising: transmitting second control information associated with the first set of reserved resources before transmitting the message.

Aspect 22: The method of Aspect 21, wherein the second control information includes an indication that the first reserved set of resources are reused from the at least one second UE.

Aspect 23: The method of any of Aspects 21 through 22, wherein the second control information is transmitted on a different sub-channel than a sub-channel used to receive the first control information associated with the first reserved set of resources.

Aspect 24: The method of any of Aspects 21 through 22, wherein the second control information is transmitted on a different sub-channel than a first sub-channel within the first set of reserved resources, and wherein the second control information includes an indication of the first sub-channel.

Aspect 25: The method of any of Aspects 21 through 24, wherein the second control information is transmitted on a different sub-channel, selected using one or more rules, than a first sub-channel within the first set of reserved resources.

Aspect 26: The method of any of Aspects 21 through 22, wherein the second control information is transmitted on a same sub-channel as used to receive the first control information, and wherein at least some content of the second control information is duplicated from the first control information.

Aspect 27: An apparatus for wireless communication at a device, comprising a processor; memory coupled with the processor; and instructions stored in the memory and executable by the processor to cause the apparatus to perform the method of one or more of Aspects 1-26.

Aspect 28: A device for wireless communication, comprising a memory and one or more processors coupled to the memory, the one or more processors configured to perform the method of one or more of Aspects 1-26.

Aspect 29: An apparatus for wireless communication, comprising at least one means for performing the method of one or more of Aspects 1-26.

Aspect 30: A non-transitory computer-readable medium storing code for wireless communication, the code comprising instructions executable by a processor to perform the method of one or more of Aspects 1-26.

Aspect 31: A non-transitory computer-readable medium storing a set of instructions for wireless communication, the set of instructions comprising one or more instructions that, when executed by one or more processors of a device, cause the device to perform the method of one or more of Aspects 1-26.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a first user equipment (UE), comprising:
 a memory; and
 one or more processors, coupled to the memory, configured to:
  receive, from at least one second UE, first control information associated with a first reserved set of resources on a sidelink channel, the first control information enabling a determination of at least one first distance between the first UE and the at least one second UE based on one or more resource dimensions;
  attempt to decode additional control information based at least in part on the first control information; and
  transmit, based at least in part on failing to decode the additional control information and using a first transmit power, a message using the first reserved set of resources, wherein the first transmit power is based at least in part on the at least one first distance.

2. The apparatus of claim 1, wherein the first control information includes sidelink control information.

3. The apparatus of claim 1, wherein the one or more processors are further configured to:
 determine a subset of unoccupied resources within the first reserved set of resources based at least in part on failing to decode the additional control information.

4. The apparatus of claim 1, wherein, to determine the at least one first distance, the one or more processors are configured to:
 measure a reference signal associated with the first control information; and
 determine a pathloss estimate to the at least one second UE based at least in part on the measuring,
  wherein the at least one first distance is determined based at least in part on the pathloss estimate.

5. The apparatus of claim 1, wherein the one or more processors are further configured to:

determine a coverage distance associated with the first reserved set of resources by decoding the first control information, wherein the at least one first distance is determined based at least in part on the coverage distance.

6. The apparatus of claim 5, wherein the coverage distance is further determined based at least in part on a physical distance between the first UE and the at least one second UE.

7. The apparatus of claim 1, wherein the one or more processors are further configured to:

estimate a propagation distance associated with the first reserved set of resources based at least in part on information obtained by decoding the first control information.

8. The apparatus of claim 1, wherein the at least one first distance is determined based at least in part on an estimate of interference, between a data channel associated with the first UE and at least one data channel associated with the at least one second UE, using the first reserved set of resources.

9. The apparatus of claim 1, wherein the one or more processors are further configured to:

determine, based on the one or more resource dimensions, a second distance based at least in part on an estimate of interference between a control channel associated with the first UE and at least one control channel associated with the at least one second UE.

10. The apparatus of claim 9, wherein the message is transmitted with a transmit power based at least in part on the second distance.

11. The apparatus of claim 1, wherein the one or more processors are further configured to:

determine, based on the one or more resource dimensions, at least one second distance based at least in part on an estimate of interference between a data channel associated with the first UE and at least one data channel used for retransmission and associated with the at least one second UE, wherein the message is transmitted with a second transmit power based at least in part on the at least on second distance when transmitted in a time period associated with the retransmission.

12. The apparatus of claim 1, wherein the message is not transmitted in a time period associated with a final transmission within the first reserved set of resources.

13. The apparatus of claim 1, wherein the message is transmitted using one or more resources within the first reserved set of resources, and wherein the one or more resources are determined based at least in part on the first transmit power.

14. The apparatus of claim 1, wherein the one or more processors are further configured to:

receive, from at least one third UE, second control information associated with a second reserved set of resources on the sidelink channel; and determine, based on the one or more resource dimensions, at least one second distance between the first UE and the at least one third UE, wherein the first transmit power is further based at least in part on the second distance.

15. The apparatus of claim 14, wherein the one or more processors are further configured to:

determine, based on the one or more resource dimensions, at least one third distance based at least in part on an estimate of interference between a data channel associated with the first UE and at least one data channel used for retransmission and associated with the at least one second UE; and determine, based on the one or more resource dimensions, at least one fourth distance based at least in part on an estimate of interference between a data channel associated with the first UE and at least one data channel used for retransmission and associated with the at least one third UE, wherein the message is transmitted with a second transmit power based at least in part on the at least one third distance and the at least one fourth distance, and wherein the message is not transmitted in a time period associated with a final transmission.

16. The apparatus of claim 15, wherein the one or more processors are further configured to:

determine, based on the one or more resource dimensions, at least one fifth distance based at least in part on an estimate of interference between a control channel associated with the first UE and at least one control channel used for retransmission associated with the at least one second UE; and determine, based on the one or more resource dimensions, at least one sixth distance based at least in part on an estimate of interference between a control channel associated with the first UE and at least one control channel used for retransmission associated with the at least one third UE, wherein the second transmit power is further based at least in part on the at least one fifth distance and the at least one sixth distance.

17. The apparatus of claim 1, wherein the one or more processors are further configured to:

receive, from at least one third UE, second control information associated with a second reserved set of resources on the sidelink channel;

determine, based on the one or more resource dimensions, at least one second distance based at least in part on an estimate of interference between a data channel associated with the first UE and at least one data channel associated with the at least one third UE;

determine, based on the one or more resource dimensions, at least one third distance based at least in part on an estimate of interference between a control channel associated with the first UE and at least one control channel associated with the at least one second UE; and determine, based on the one or more resource dimensions, at least one fourth distance based at least in part on an estimate of interference between a control channel associated with the first UE and at least one control channel associated with the at least one third UE, wherein the first transmit power is further based at least in part on the at least one second distance, the at least one third distance, and the at least one fourth distance.

18. The apparatus of claim 17, wherein the one or more processors are further configured to:

determine, based on the one or more resource dimensions, at least one fifth distance based at least in part on an estimate of interference between a data channel associated with the first UE and at least one data channel used for retransmission and associated with the at least one second UE; and determine, based on the one or more resource dimensions, at least one sixth distance based at least in part on an estimate of interference between a data channel associated with the first UE and at least one data channel used for retransmission and associated with the at least one third UE,
 wherein the message is transmitted with a second transmit power based at least in part on the at least one fifth distance and the at least one sixth distance, and wherein the message is not transmitted in a time period associated with a final transmission.

19. The apparatus of claim 18, wherein the one or more processors are further configured to:
 determine, based on the one or more resource dimensions, at least one seventh distance based at least in part on an estimate of interference between a control channel associated with the first UE and at least one control channel used for retransmission associated with the at least one second UE; and
 determine, based on the one or more resource dimensions, at least one eighth distance based at least in part on an estimate of interference between a control channel associated with the first UE and at least one control channel used for retransmission associated with the at least one third UE,
 wherein the second transmit power is further based at least in part on the at least one seventh distance and the at least one eighth distance.

20. The apparatus of claim 1, wherein the one or more processors are further configured to:
 transmit second control information associated with the first set of reserved resources before transmitting the message.

21. The apparatus of claim 20, wherein the second control information includes an indication that the first reserved set of resources are reused from the at least one second UE.

22. The apparatus of claim 20, wherein the second control information is transmitted on a different sub-channel than a sub-channel used to receive the first control information associated with the first reserved set of resources.

23. The apparatus of claim 22, wherein the second control information is transmitted on a different sub-channel than a first sub-channel within the first set of reserved resources, and wherein the second control information includes an indication of the first sub-channel.

24. The apparatus of claim 22, wherein the second control information is transmitted on a different sub-channel, selected using one or more rules, than a first sub-channel within the first set of reserved resources.

25. The apparatus of claim 20, wherein the second control information is transmitted on a same sub-channel as used to receive the first control information, and wherein at least some content of the second control information is duplicated from the first control information.

26. A method of wireless communication performed by a first user equipment (UE), comprising:
 receiving, from at least one second UE, first control information associated with a first reserved set of resources on a sidelink channel, the first control information enabling a determination of at least one first distance between the first UE and the at least one second UE based on one or more resource dimensions;
 attempting to decode additional control information based at least in part on the first control information; and
 transmitting, based at least in part on failing to decode the additional control information and using a first transmit power, a message using the first reserved set of resources, wherein the first transmit power is based at least in part on the at least one first distance.

27. A non-transitory computer-readable medium storing a set of instructions for wireless communication, the set of instructions comprising:
 one or more instructions that, when executed by one or more processors of a first user equipment (UE), cause the first UE to:
  receive, from at least one second UE, first control information associated with a first reserved set of resources on a sidelink channel, the first control information enabling a determination of at least one first distance between the first UE and the at least one second UE based on one or more resource dimensions;
  attempt to decode additional control information based at least in part on the first control information; and
  transmit, based at least in part on failing to decode the additional control information and using a first transmit power, a message using the first reserved set of resources, wherein the first transmit power is based at least in part on the at least one first distance.

28. An apparatus for wireless communication, comprising:
 means for receiving, from at least one UE, first control information associated with a first reserved set of resources on a sidelink channel, the first control information enabling a determination of at least one first distance between the apparatus and the at least one UE based on one or more resource dimensions;
 means for attempting to decode additional control information based at least in part on the first control information; and
 means for transmitting, based at least in part on failing to decode the additional control information and using a first transmit power, a message using the first reserved set of resources, wherein the first transmit power is based at least in part on the at least one first distance.

29. The non-transitory computer-readable medium of claim 27, wherein the one or more instructions, when executed by the one or more processors of the first UE, cause the first UE further to:
 receive, from at least one third UE, second control information associated with a second reserved set of resources on the sidelink channel;
 determine, based on the one or more resource dimensions, at least one second distance based at least in part on an estimate of interference between a data channel associated with the first UE and at least one data channel associated with the at least one third UE;
 determine, based on the one or more resource dimensions, at least one third distance based at least in part on an estimate of interference between a control channel associated with the first UE and at least one control channel associated with the at least one second UE; and
 determine, based on the one or more resource dimensions, at least one fourth distance based at least in part on an estimate of interference between a control channel associated with the first UE and at least one control channel associated with the at least one third UE,
 wherein the first transmit power is further based at least in part on the at least one second distance, the at least one third distance, and the at least one fourth distance.

30. The apparatus of claim 28, further comprising:
 means for receiving, from at least one second UE, second control information associated with a second reserved set of resources on the sidelink channel;

means for determining, based on the one or more resource dimensions, at least one second distance based at least in part on an estimate of interference between a data channel associated with the apparatus and at least one data channel associated with the at least one second UE; and means for determining, based on the one or more resource dimensions, at least one third distance based at least in part on an estimate of interference between a control channel associated with the apparatus and at least one control channel associated with the at least one second UE, wherein the first transmit power is further based at least in part on the at least one second distance and the at least one third distance.

\* \* \* \* \*